US008106827B2

(12) United States Patent
Sugiyama

(10) Patent No.: US 8,106,827 B2
(45) Date of Patent: Jan. 31, 2012

(54) ADAPTIVE ARRAY CONTROL DEVICE, METHOD AND PROGRAM, AND ADAPTIVE ARRAY PROCESSING DEVICE, METHOD AND PROGRAM

(75) Inventor: Akihiko Sugiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 305 days.

(21) Appl. No.: 12/297,869

(22) PCT Filed: Apr. 12, 2007

(86) PCT No.: PCT/JP2007/058097
§ 371 (c)(1),
(2), (4) Date: Oct. 20, 2008

(87) PCT Pub. No.: WO2007/123051
PCT Pub. Date: Nov. 1, 2007

(65) Prior Publication Data
US 2009/0121934 A1  May 14, 2009

(30) Foreign Application Priority Data
Apr. 20, 2006  (JP) .................................. 2006-117288

(51) Int. Cl.
*G01S 3/16* (2006.01)
*H01Q 3/02* (2006.01)
(52) U.S. Cl. ......................... 342/383; 342/372; 342/378
(58) Field of Classification Search .................. 342/157, 342/368, 372, 378, 383
See application file for complete search history.

(56) References Cited

U.S. PATENT DOCUMENTS
2006/0122832 A1    6/2006   Takiguchi et al.

FOREIGN PATENT DOCUMENTS
| JP | 08-122424 | 5/1996 |
|---|---|---|
| JP | 10-207490 | 8/1998 |
| JP | 11-052988 | 2/1999 |
| JP | 2000-181498 A | 6/2000 |
| JP | 2003-140700 A | 5/2003 |
| JP | 2003-232849 A | 8/2003 |
| JP | 2003-271191 A | 9/2003 |
| JP | 2003-333683 A | 11/2003 |
| JP | 2004-289762 A | 10/2004 |

(Continued)

OTHER PUBLICATIONS

S. Affes et al., "Robust Adaptive Beamforming Via LMS-Like Target Tracking," IEEE Proceedings of International Conference on Acoustics, Speech and Signal Processing, vol. IV, pp. 269-272, Apr. 1994.

(Continued)

*Primary Examiner* — Dao Phan
(74) *Attorney, Agent, or Firm* — Foley & Lardner LLP

(57) ABSTRACT

An adaptive array control device is described. The adaptive array control device includes a first array processing section and a second array processing section in which phase responses are almost opposite with respect to a target signal and a signal incoming from another direction. The adaptive array control device further includes a control signal generation section, and a control section. The control signal generation section calculates a control signal using output signals of the first array processing section and the second array processing section. The control section controls speed and accuracy of parameter adjustment in adaptive array processing using the control signal. An adaptive array controlling method, and a computer readable recording medium storing an adaptive array controlling program are also described.

41 Claims, 23 Drawing Sheets

FOREIGN PATENT DOCUMENTS

JP    2005-249816 A    9/2005

OTHER PUBLICATIONS

M. Brandstein et al., "Microphone Arrays," Ch. 1, Fig. 1.1, Springer-Verlag, Berlin, 2001.

M. Brandstein et al., "Microphone Arrays," Ch. 5, Springer-Verlag, Berlin, 2001.

I. Claesson et al., "A Spatial Filtering Approach to Robust Adaptive Beaming," IEEE Transactions on Antennas and Propagation, vol. 40:9, Sep. 1992, pp. 1093-1096.

O.L. Frost, III, "An Algorithm for Linearly Constrained Adaptive Array Processing," Proceedings of the IEEE, vol. 60:8, Aug. 1972, pp. 926-935.

J. E. Greenberg et al., "Evaluation of an Adaptive Beamforming Method for Hearing Aids," J. Acoust. Soc. Am 91:3, Mar. 1992, pp. 1662-1676.

L. J. Griffiths, "An Alternative Approach to Linearly Constrained Adaptive Beamforming," IEEE Transactions on Antennas and Propagation, vol. AP-30:1, Jan. 1982, pp. 27-34.

O. Hoshuyama et al., "A Robust Generalized Sidelobe Canceller with a Blocking Matrix Using Leaky Adaptive Filters," IEEE Transactions of the Institute of Electronics, Information and Communication, vol. 79:9, Sep. 1996, pp. 1516-1524.

O. Hoshuyama et al., "A Realtime Robust Adaptive Microphone Array Controlled by an SNR Estimate," IEEE Proceedings of ICASSP, Apr. 1998, pp. 3604-3608.

O Hoshuyama et al., "An adaptive microphone array with good sound quality using auxiliary fixed beamformers and its DSP implementation," IEEE Proceedings of ICASSP, Mar. 1991, pp. 949-952.

S. Haykin, "Radar Array Processing for Angle of Arrival Estimation," Chapter 4, Array Signal Processing, Prentice-Hall, Englewood Clifs, 1993, pp. 194-292.

ADAPTIVE ARRAY CONTROL DEVICE, METHOD AND PROGRAM, AND ADAPTIVE ARRAY PROCESSING DEVICE, METHOD AND PROGRAM

TECHNICAL FIELD

The present invention relates to an adaptive array control device, a method and their program, and an adaptive array processing device, a method, and their program. In particular, the present invention relates to an adaptive array control device, method and program for spatio-selectively receiving signals using a plurality of sensors, and an adaptive array processing device, method, and its program.

BACKGROUND ART

Conventionally, in the field of audio signal acquisition, sonars, and wireless communications, a speech enhancement device by means of an adaptive microphone array and a wireless transceiver by means of an adaptive antenna array have been known, for example. Such a device is capable of enhancing and receiving only a particular signal from a plurality of signal sources, which is an application of an adaptive array technique. As sensors, microphones, ultrasonic sensors, sonar receivers, and radio wave antennas may be used. Here, a case of using microphones as sensors will be described.

Hereinafter, in order to simplify the description, a case where microphones are arranged on a line at equal interval will be considered. Further, it assumes that a target audio source is sufficiently distant from the line on which the microphones are arranged, and that the direction of the target audio source is orthogonal to the line.

A microphone array filters signals input to a plurality of microphones, and then adds them to form a spatial filter. With this spatial filter, only a signal incoming from a predefined direction, or a switch target signal, is enhanced, and signals other than the target signal are attenuated. An adaptive microphone array is an array of microphones having a function of adaptively varying the spatial filter characteristics. As a configuration of an adaptive microphone array, a "generalized sidelobe canceller" disclosed in Non-Patent Document 1, the configuration disclosed in Non-Patent Document 2, the configuration disclosed in Non-Patent Document 3, the "frost beamformer" disclosed in Non-Patent Document 4, and the configuration disclosed in Non-Patent Document 5, have been known, for example.

A generalized sidelobe canceller, which is a basic adaptive array processing device disclosed in Non-Patent Document 1, includes a fixed beamformer, a blocking matrix circuit, and a multi-input canceller. The blocking matrix circuit includes an adaptive blocking matrix circuit including adaptive filters. The fixed beamformer processes a plurality of sensor signals and enhances a target signal. The blocking matrix circuit suppresses the target signal included in the plurality of sensor signals, and relatively enhances interferences.

The adaptive blocking matrix circuit subtracts a pseudo target signal generated by the adaptive filters from the plurality of the sensor signals with the fixed beamformer output being used as a reference signal, and supplies to a multi-input canceller. The adaptive filter coefficient of the adaptive blocking matrix circuit is to be updated so as to minimize an output of the adaptive blocking matrix circuit with use of the fixed beamformer output and an output of the adaptive blocking matrix. The multi-input canceller subtracts a pseudo interference generated by the adaptive filters from the fixed beamformer output with an output of the blocking matrix circuit being used as a reference signal. In the signal obtained by the subtraction processing, the target signal is enhanced and the interference is suppressed, which becomes an array display output. Through the subtraction processing, correlation of the output signal with respect to the interference is eliminated. The adaptive filter coefficient of the multi-input canceller is updated to minimize the multi-input canceller output using the blocking matrix circuit output and the multi-input canceller output.

As the fixed beamformer, a delay-and-sum beamformer which delays respective sensor signals and adds them, a filter-and-sum beamformer which filters and adds them, may be used. Those fixed beamformers are described in Non-Patent Document 6 in detail.

The delay-and-sum beamformer delays a plurality of sensor signals for only the unique number of samples of each signal, and after multiplying a unique coefficient by each signal, calculates the sum and outputs it. The delay time of each signal is set such that after each sensor signal is delayed, the phases of the target signal included therein will become the same. Consequently, the target signal included in the output of the delay-and-sum beamformer is enhanced. On the other hand, for the interference incoming from a direction different from that of the target signal, as the phases are different from each other in the respective delayed signals, the interferences are offset each other by addition and attenuated.

As such, in the output of the delay-and-sum beamformer, the target signal is enhanced and the interferences are attenuated. The filter-and-sum beamformer has a configuration such that delaying and constant multiplying with respect to sensor signals in the delay-and-sum beamformer are replaced with filters. Those filters can be made such that effects of delaying and constant multiplying in the delay-and-sum beamformer differ with respect to respective frequencies. As such, the target signal enhancing effect is more enhanced compared to that of the delay-and-sum beamformer with respect to signals in which spectrum is not flat.

The adaptive blocking matrix circuit and the multi-input canceller include a plurality of adaptive filters. As such adaptive filters, structures of FIR filters, IIR filters, and lattice filters may be used. Further, as a coefficient update algorithm of those adaptive filters, NLMS algorithm (learning identification method or normalized LMS algorithm), RLS algorithm (sequential minimum square method), a projection algorithm, a gradient method, an LS algorithm (minimum square method), a block adaptive algorithm, and adaptive algorithm of transform region may be used. Further, when performing coefficient updating, a tap coefficient constraint adaptive algorithm applying constraint to a coefficient value to be newly calculated, a leak adaptive algorithm, and a tap norm constraint adaptive algorithm applying constraint to a coefficient value norm may be used. As those coefficient update algorithms with constraint are described in Non-Patent Document 7 in detail, the description is omitted.

In the coefficient update of the adaptive blocking matrix circuit, the enhanced interference becomes an unnecessary signal for coefficient update, and in the coefficient update of the multi-input canceller, the enhanced target signal becomes an unnecessary signal for coefficient update, both of which disturb coefficient update. As such, in either case, the adaptive filter coefficient is disturbed, so that uncomfortable breathing noises are caused in the output signal of the array processing device. In order to prevent the noises, it is necessary to make the coefficient update step size small. However, a small step size causes a delay of the speed with which the characteristics of the adaptive blocking matrix circuit follows the movement of the target signal, so that the quality of the adaptive array device output which is the final output is deteriorated. In order to solve this problem, adaptive mode control devices are disclosed in Non-Patent Documents 8 and 9.

In the method disclosed in Non-Patent Document 8, presence of the interference is detected using correlation between signals obtained from adjacent sensors. By halting coefficient update when the interference is detected, a fine output of the adaptive array device can be obtained. In this method, as it is developed to be applied for hearing aid, microphone intervals are set to be wide, and the signal band is restricted from about 600 Hz to 1200 Hz in order to prevent spatial aliasing. In an application of using normal audio signals, as the audio power may sometimes also be present outside this frequency range, presence of interferences cannot be detected accurately. Further, as it is configured to control coefficient update of only multi-input canceller while assuming a fixed blocking matrix circuit, it cannot be directly applied to the adaptive blocking matrix circuit.

In the method disclosed in Non-Patent Document 9, presence of interference is detected using a power ratio of the target signal to the interference (SIR). The power estimation of the target signals is performed using a fixed beamformer output. The power estimation of the interference is performed using an output of the adaptive blocking matrix circuit. The ratio of these estimation values (that is, estimation values of SIR) is compared with a threshold. If SIR is larger than the threshold, as the target signal is prevailing in the input signal and effects of the target signal are small, coefficient update will be performed in the adaptive blocking matrix circuit. In contrast, as the target signal interrupts coefficient update of the multi-input canceller, coefficient update of the multi-input canceller is halted. If SIR is smaller than the threshold, the coefficient update is halted in the adaptive blocking matrix circuit, and coefficient update is performed in the multi-input canceller. In this method, the adaptive blocking matrix circuit does not exhibit sufficient performance until the adaptive filter coefficient included in the adaptive blocking matrix circuit is converged, so that estimation of the interference power becomes inaccurate. As such, particularly in the initial timing of operation, errors may be easily caused in the coefficient update control of the adaptive blocking matrix circuit and the multi-input canceller, leading to deterioration in the output audio of the array processing device. In order to solve this problem, Non-Patent Document 10 discloses an adaptive mode control device having a dedicated fixed blocking matrix circuit.

In the method disclosed in Non-Patent Document 10, power estimation of interference is performed using a dedicated fixed blocking matrix circuit. As such, desired performance can be achieved irrespective of the convergence of the adaptive filter coefficient included in the adaptive blocking matrix circuit, which enables accurate interference power estimation.

FIG. 22 shows a configuration in which the adaptive array processing device disclosed in Non-Patent Document 9 is combined with the adaptive mode control device disclosed in Non-Patent Document 10. The adaptive array processing device disclosed in Non-Patent Document 9 includes a fixed beamformer 200, an adaptive blocking matrix circuit 300, a delay element 400, and a multi-input canceller 500. Further, the adaptive mode control device includes a blocking matrix circuit 310, an SIR estimation section 700, and a comparator section 800.

The fixed beamformer 200 processes signals obtained from M pieces of sensors $100_0$ to $100_{M-1}$ to thereby enhance a target signal. The adaptive blocking matrix circuit 300 suppresses the target signal included in the plurality of sensor signals, and relatively enhances interference. This is achieved by generating pseudo target signals by a plurality of adaptive filters with an output of the fixed beamformer 200 being used as a reference signal, and subtracting them from signals obtained from M pieces of the sensors $100_0$ to $100_{M-1}$. The coefficient of the adaptive filter is updated such that an output of the adaptive blocking matrix circuit 300 is minimized, by using an output of the fixed beamformer 200 and an output of the adaptive blocking matrix circuit 300.

The delay element 400 delays an output of the fixed beamformer 200 by L sample, and supplies it to the multi-input canceller 500. The value of L is set such that the phases of the target signal component in the output of the delay element 400 and the target signal component in the output of the adaptive blocking matrix circuit 300 become the same. For example, it may be set to the sum of the group delay time of the fixed beamformer 200 and a time corresponding to about one fourth to a half of the number of taps of the adaptive blocking matrix circuit 300.

The multi-input canceller 500 receives and performs processing on a signal formed by delaying the output signal of the fixed beamformer 200 and an output signal of the adaptive blocking matrix circuit 300 to thereby suppress interference, and further enhances the target signal relatively. The multi-input canceller 500 receives the enhanced interference as a reference signal from the adaptive blocking matrix circuit 300, and as a signal correlated to this signal, generates a pseudo interference by adaptive filters. The generated pseudo interference is subtracted from the enhanced target signal which is an output of the delay element 400. This output is transmitted to the output terminal 600. The adaptive filter coefficient of the multi-input canceller 500 is updated, using the output of the adaptive blocking matrix circuit 300 and the output signal transmitted to the output terminal 600, so as to minimize the output signal.

The output of the adaptive blocking matrix circuit 300 to be used in coefficient update of the adaptive blocking matrix circuit 300 includes interference and a suppressed target signal. However, as the adaptive blocking matrix circuit 300 can affect only the target signal component, the interference is output as it is. In other words, the adaptive blocking matrix circuit 300 can minimize only the target signal component, and the interference component included in this output disturbs coefficient update. With the disturbing, the adaptive filter coefficient included in the adaptive blocking matrix circuit 300 is disordered, so that the signal transmitted to the multi-input canceller 500 becomes unstable. As a result, the output of the multi-input canceller 500, that is, the output of the entire adaptive array device, is disturbed, causing uncomfortable breathing noises. In order to prevent the noises, SIR is estimated using the plurality of sensor signals, and the coefficient update of the adaptive blocking matrix circuit 300 is controlled using the estimated value.

Similarly, the target signal enhanced in the coefficient update of the multi-input canceller 500 becomes an unnecessary signal for coefficient update, disturbing the coefficient update. With the disturbing, the adaptive filter coefficient included in the multi-input canceller 500 is disordered, causing uncomfortable breathing noises in the adaptive array device output. As such, same as the adaptive blocking matrix circuit 300, SIR of the plurality of sensor signals is estimated, and coefficient update of the multi-input canceller 500 is controlled with the estimated value.

The SIR estimation section 700 performs SIR estimation using the output of the blocking matrix circuit 310 and the output of the fixed beamformer 200. Power estimation of the target signal is performed using the output of the fixed beamformer. Power estimation of the interference is performed using the output of the fixed blocking matrix circuit. The two estimate values are supplied to the SIR estimation section 700, and the ratio is calculated to serve as an estimated SIR value. The estimated SIR value is transmitted from the SIR estimation section 700 to the comparator section 800. The comparator section 800 compares the estimated SIR value with a threshold. If the estimated SIR value is larger than the threshold, as the target signal is prevailing in the input signal so that effect of the interference is small, a control signal for performing coefficient update in the adaptive blocking matrix circuit is generated, and the signal is supplied to the adaptive blocking matrix circuit 300. In contrast, as the target signal disturbs in the coefficient update of the multi-input canceller 500, a control signal for halting coefficient update of the multi-input canceller is generated, and the signal is supplied to the multi-input canceller 500. If the estimated SIR value is smaller than the threshold, coefficient is halted in the adaptive blocking matrix circuit, and a signal for performing coefficient update in the multi-input canceller is generated and supplied to the adaptive blocking matrix circuit 300 and the multiple input canceller 500, respectively.

FIG. 23 shows an exemplary configuration of the blocking matrix circuit 310, which is configured with a subtracter 311 for calculating the difference between the $i^{th}$ sensor signal $X_i(k)$ and the $(i+1)^{th}$ sensor signal $X_{i+1}(k)$. Here, k is an indicator showing the time, and i is an integer in a range from 0 to M−2. The output signal $Z(k)$ of the blocking matrix circuit 310 becomes $X_i(k)-X_{i+1}(k)$. With respect to the target signal incoming from the front, $X_i(k)$ and $X_{i+1}(k)$ are equal, so that $Z(k)=0$ is established. With respect to interference incoming from another direction, $Z(k)$ is not zero. As such, the fixed blocking matrix circuit 310 has an advantage of suppressing the target signal.

Non-Patent Document 1: IEEE TRANSACTIONS ON ANTENNAS AND PROPAGATIONS, VOL. 30, NO. 1, PP. 27-34, January 1982
Non-Patent Document 2: IEEE TRANSACTIONS ON ANTENNAS AND PROPAGATIONS, VOL. 40, NO. 9, PP. 1093-1096, September 1992
Non-Patent Document 3: THE TRANSACTIONS OF THE INSTITUTE OF ELECTRONICS, INFORMATION AND COMMUNICATION ENGINEERS A, VOL. 79, NO. 9, PP. 1516-1524, September 1996
Non-Patent Document 4: PROCEEDINGS OF IEEE, VOL. 60, NO. 8, PP. 926-935, August 1972
Non-Patent Document 5: IEEE PROCEEDINGS OF INTERNATIONAL CONFERENCE ON ACOUSTICS, SPEECH, AND SIGNAL PROCESSING, VOL. IV, PP. 269-272, April, 1994
Non-Patent Document 6: CH. 4, ARRAY SIGNAL PROCESSING, PRENTICE-HALL, ENGLEWOOD CLIFS, 1993
Non-Patent Document 7: MICROPHONE ARRAYS, SPRINGER, 2001
Non-Patent Document 8: JOURNAL OF ACOUSTICAL SOCIETY OF AMERICA, VOL. 91, NO. 3, PP. 1662-1676, March 1992
Non-Patent Document 9: IEEE PROCEEDINGS OF ICASSP, PP. 3605-3608, April 1998
Non-Patent Document 10: IEEE PROCEEDINGS OF ICASSP, PP. 949-952, March 1999
Non-Patent Document 11: CH1, MICROPHONE ARRAYS, SPRINGER-VERLAG, BERLIN, 2001.

DISCLOSURE OF THE INVENTION

Problems to be Solved by the Invention

In order to prevent distortion which may be caused due to space aliasing, the maximum interval between sensors, determined by the wavelength and the sound speed, is set. Further, the value of the number of pieces M of sensors also has an upper limit, practically. In that case, in a fixed beamformer performing power estimation of a target signal and a fixed blocking matrix circuit performing power estimation of interference, the frequency characteristics are not flat, and also, selectivity based on directions of a target signal and interference is not enough. As such, with the traditional art including that shown in FIG. 22, an error may not be avoidable in the power estimation depending on the frequency characteristics of input signals or directions of a target signal and interference, causing performance deterioration due to an inappropriate coefficient updating control of the adaptive array processing device.

It is an object of the present invention to provide an adaptive array control device, an adaptive array controlling method, and their program, which are less influenced by the frequency characteristics of input signals and directions of a target signal and interference, and capable of performing accurate coefficient update.

Means for Solving the Problems

In order to achieve the above object, an adaptive array control device of the present invention includes: a first array processing section which performs first array processing in which a gain is non-zero with respect to a first signal among a plurality of signals transmitted from a plurality of sensors arranged in an array to thereby acquire a first array-processed signal; a second array processing section which performs second array processing in which an amplitude response is same as and a phase response is almost opposite to those of the first array processing to thereby acquire a second array-processed signal; a control signal generation section which acquires a control signal using the first array-processed signal and the second array-processed signal; and a control section which controls speed and accuracy of parameter adjustment in adaptive array processing using the control signal.

Here, the control signal generation section includes a correlation section which calculates correlation between the first array-processed signal and the second array-processed signal.

Further, the first array processing section has a first filter for processing the first array-processed signal.

Further, the second array processing section has a second filter for processing the second array-processed signal.

The first array processing section includes a plurality of pairs of sensors having different sensor intervals.

Further, the second array processing section includes a plurality of pairs of sensors having different sensor intervals.

The first array processing section includes a plurality of sub-array processing sections which perform array processing independently on a plurality of signals of different frequencies.

Further, the second array processing section includes a plurality of sub-array processing sections which perform array processing independently on a plurality of signals of different frequencies.

In order to achieve the above object, an adaptive array controlling method of the present invention includes: a first array-processed signal generation step and a second array-processed signal generation step for performing first array processing and second array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a first array-processed signal and a second array-processed signal; a first control signal generation step for acquiring a control signal based on a relative ratio of a target signal and other signals among input signals using the first array-processed signal and the second array-processed signal acquired in the first array-processed signal generation step and the second array-processed signal generation step; and a first parameter adjustment control step for controlling speed and accuracy of parameter adjustment in adaptive array processing using the control signal.

Here, in the first array processing and the second array processing performed in the first array-processed signal generation step and the second array-processed signal generation step, a gain with respect to a target signal is non-zero.

Further, in the first control signal generation step, the control signal is generated with use of correlation between the first array-processed signal and the second array-processed signal acquired in the first array-processed signal generation step and the second array-processed signal generation step.

Further, the first control signal generation step includes a first filter-processed signal generation step for filtering the first array-processed signal acquired in the first array-processed signal generation step and the second array-processed signal generation step to thereby acquire a first filter-processed signal, and the control signal is acquired using the first filter-processing signal acquired in this step.

Further, the first control signal generation step includes a second filter-processed signal generation step for filtering the second array-processed signal acquired in the first array-processed signal generation step and the second array-processed signal generation step to thereby acquire a second filter-processed signal, and the control signal is acquired using the second filter-processing signal acquired in this step.

In the first array-processed signal generation step and the second array processing signal generation step, signals acquired from a plurality of pairs of sensors having different sensor intervals are array-processed to thereby acquire a first array-processed signal.

Further, signals acquired from a plurality of pairs of sensors having different sensor intervals are array-processed to thereby acquire a second array-processed signal.

The first array-processed signal generation step and the second array-processed signal generation step include a sub-array-processed signal generation step for performing array processing for a plurality of times corresponding to a plurality of different frequency bands to thereby acquire a plurality of sub-array-processed signals, and the first array-processed signal is acquired using the sub-array-processed signals acquired in the sub-array-processed signal generation step.

Further, the steps include a sub-array-processed signal generation step for performing array processing for a plurality of times corresponding to a plurality of different frequency bands to thereby acquire a plurality of sub-array-processed signals, and the second array-processed signal is acquired using the sub-array-processed signals acquired in the sub-array-processed signal generation step.

In order to achieve the above object, an adaptive array controlling program of the present invention causes a computer to perform functions of: performing first array processing in which a gain is non-zero with respect to a first signal to thereby acquire a first array-processed signal; performing second array processing in which an amplitude response is same as and a phase response is almost opposite to those of the first array processing to thereby acquire a second array-processed signal; acquiring a control signal using the first array-processed signal and the second array-processed signal; and controlling speed and accuracy of parameter adjustment in adaptive array processing using the control signal.

In order to achieve the above object, an array processing device of the present invention includes: a third array processing section and a fourth array processing section which perform third array processing and fourth array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a third array-processed signal and a fourth array-processed signal; and a direction estimation section which estimates a deviation, from the front, of a signal incoming direction using the third array-processed signal and the fourth array-processed signal.

Further, an adaptive array processing device of the present invention includes: a third array processing section which enhances a first signal, among a plurality of signals transmitted from a plurality of sensors arranged in an array, with respect to other signals to thereby acquire a third array-processed signal; a fourth array processing section which attenuates the first signal with respect to other signals to thereby acquire a fourth array-processed signal; a correlation elimination section which eliminates a signal component correlated to the fourth array-processed signal from the third array-processed signal by means of adaptive array processing; a first array processing section which performs first array processing in which a gain is non-zero with respect to the first signal to thereby acquire a first array-processed signal; a second array processing section which performs second array processing in which an amplitude response is same as and a phase response is almost opposite to those of the first array processing to thereby acquire a second array-processed signal; a control signal generation section which acquires a control signal using the first array-processed signal and the second array-processed signal; and a control section which controls speed and accuracy of parameter adjustment in adaptive array processing using the control signal.

Here, the control signal generation section includes a correlation section which acquires correlation between the first array-processed signal and the second array-processed signal.

Further, the first array processing section and the second array processing section perform array processing on signals acquired from a plurality of pairs of sensors having different sensor intervals to thereby acquire a first array-processed signal and a second array-processed signal.

In order to achieve the above object, an array processing method including: a third array-processed signal generation step and a fourth array-processed signal generation step for performing third array processing and fourth array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a third array-processed signal and a fourth array-processed signal; and a signal deviation estimating step for estimating deviation, from the front, of a signal incoming direction with use of the third array-processed signal and the fourth array-processed signal.

In order to achieve the above object, an adaptive array processing method includes: a third array-processed signal generation step for enhancing a first signal among a plurality of signals transmitted from a plurality of sensors arranged in an array to thereby acquire a third array-processed signal; a fourth array-processed signal generation step for attenuating the first signal with respect to other signals to thereby acquire a fourth array-processed signal; an adaptive array processing step for eliminating a signal component correlated to the fourth array-processed signal acquired in the fourth array-processed signal generation step from the third array-processed signal by means of adaptive array processing; a first array-processed signal generation step for performing first array processing in which a gain is non-zero with respect to the first signal to thereby acquire a first array-processed signal; a second array-processed signal generation step for performing second array processing in which an amplitude response is same as and a phase response is almost opposite to those of the first array processing to thereby acquire a second array-processed signal; a second control signal generation step for acquiring a control signal using the first array-processed signal and the second array-processed signal acquired in the first array-processing signal generation step and the second array-processed signal generation step; and a second parameter adjustment controlling step for controlling speed and accuracy of parameter adjustment in the adaptive array processing step using the control signal.

In the second control signal generation step, the control signal is generated using correlation between the first array-processed signal and the second array-processed signal.

Further, in the first array-processed signal generation step and the second array-processed signal generation step, signals acquired from a plurality of pairs of sensors having different sensor intervals are array-processed to thereby acquire the first array-processing signal and the second array-processed signal.

In order to achieve the above object, an adaptive array processing program of the present invention causes a computer to perform functions of: enhancing a first signal with respect to other signals to thereby acquire a third array-processed signal; attenuating the first signal with respect to other signals to thereby acquire a fourth array-processed signal; eliminating a signal component correlated to the fourth array-processed signal acquired in the fourth array-processed signal generation step from the third array-processed signal by means of adaptive array processing; performing first array processing in which a gain is non-zero with respect to the first signal to thereby acquire a first array-processed signal; performing second array processing in which an amplitude response is same as and a phase response is almost opposite to those of the first array processing to thereby acquire a second array-processed signal; acquiring a control signal using the first array-processed signal and the second array-processed signal; and controlling speed and accuracy of parameter adjustment in the adaptive array processing step using the control signal.

As described above, the adaptive array processing device, the adaptive array processing method, and their program according to the present invention use phase information of input signals to thereby estimate a relative magnitude relationship between a target signal and interference. More specifically, the present invention is characterized as to include a pair of array processing sections in which a gain with respect to a target signal does not become zero and a phase difference in processing results with respect to interference becomes close to 180 degrees, and a correlation calculation section which calculates correlation of those outputs.

Effects of the Invention

With the configuration described above, according to the present invention, a relative magnitude relationship between a target signal and interference can be estimated accurately by using a pair of array processing in which amplitude responses are the same and phase responses are opposite. As such, coefficient updating control of the adaptive array processing device can be performed appropriately, whereby high-quality array processing outputs can be acquired by reducing deterioration of signals and breathing noises in array processing outputs, which are less influenced by the frequency characteristics of input signals and directions of a target signal and interference.

BEST MODE FOR CARRYING OUT THE INVENTION

Next, exemplary embodiments of the invention will be described according to the drawings.

First Exemplary Embodiment

FIG. 1 shows a block diagram showing an adaptive array device having an adaptive array control device according to a first exemplary embodiment of the invention. Further, FIG. 21 shows an operational flowchart of the adaptive array device. The first exemplary embodiment is configured such that the blocking matrix circuit 310 and the SIR calculation section 700 in the traditional array control device shown in FIG. 22 are replaced with a leakage blocking matrix circuits 330 and 340 and a correlation calculation section 920. Hereinafter, the configuration and effects will be described based mainly on the operations of the leakage blocking matrix circuits 330 and 340 and the correlation calculation section 920.

The leakage blocking matrix circuit 330 performs first array processing to enhance a target signal and outputs a first array-processed signal (S51).

The leakage blocking matrix circuit 340 performs second array processing to attenuate the target signal, that is, to enhance interference, and outputs a second array-processed signal (S52). Then, the correlation between both outputs is calculated by the correlation calculation section 920, and transmitted to a control signal generation section.

The input signals of the leakage blocking matrix circuits 330 and 340 are equal to the input-output signal of the traditional blocking matrix circuit 310. The leakage blocking matrix circuit 330 and 340 have symmetrical structures, and have the same gain with respect to a target signal incoming from the front, and have the directivity to attenuate the target signal.

On the other hand, a phase difference between output signals of the leakage blocking matrix circuits 330 and 340 with respect to interference incoming from a direction other than the front becomes a large value near 180 degrees. The output signals of the leakage blocking matrix circuits 330 and 340 are supplied to the correlation calculation section 920. The correlation calculation section 920 calculates the correlation between the outputs of the leakage blocking matrix circuits 330 and 340, and transmits to the control section 800 (S53).

As a correlation, a normalized mutual-correlation which is a result of dividing a value obtained by accumulating a product of respective output samples of the leakage blocking matrix circuits 330 and 340 with respect to a plurality of past samples, by a product of square root of a result of accumulating respective samples of the outputs of the leakage blocking matrix circuits 330 and 340 with respect to a plurality of past sample respectively, for example. A normalized mutual-correlation γn in a sample n, determined as described above, is given by the following expression:

[Expression 1]

$$\gamma(n) = \frac{\sum_{k=0}^{N-1} v_1^2(n-k) \cdot v_2(n-k)}{\sqrt{\sum_{k=0}^{N-1} v_1^2(n-k)} \cdot \sqrt{\sum_{k=0}^{N-1} v_2^2(n-k)}} \quad (1)$$

Here, v1(n) and v2(n) are outputs of the leakage blocking matrix circuits 330 and 340, respectively. With an assumption that an input signal is white, the Expression (1) can be approximated by the following expression:

[Expression 2]

$$\gamma(n) \approx \hat{\gamma}(\rho, \vartheta) = \frac{\sum_{i=0}^{N-1} \{G^2(i, \theta) \cdot \cos[\varphi(i, \theta] + \rho \cdot G^2(i, 0)\}}{\sum_{i=0}^{N-1} \{G^2(i, \theta) + \rho \cdot G^2(i, 0)\}} \quad (2)$$

Here, G(i, θ) is a (common) gain of the leakage blocking matrix circuits 330 and 340 with respect to the $i^{th}$ frequency component and a direction θ, φ(I, θ) is a phase difference between output signals of the leakage blocking matrix circuits 330 and 340 with respect to the $i^{th}$ frequency component and a direction θ, and ρ is an actual SIR. G(i, θ) can be calculated from actual configurations of the leakage blocking matrix circuits 330 and 340.

With respect to a target signal incoming from the fronts, outputs of the leakage blocking matrix circuits 330 and 340 are equal, and a normalized mutual-correlation with respect to them has a large value near 1. On the other hand, with respect to interference incoming from a direction other than the front, as outputs of the leakage blocking matrix circuits 330 and 340 have a large phase difference, the normalized mutual-correlation becomes small. Accordingly, by transmitting the normalized mutual-correlation calculated by the correlation calculation section 920 to the control section 800, and with use of a relationship with a predetermined threshold, a coefficient update control signal of the adaptive blocking matrix circuit 300 and the multi-input canceller 500 can be generated.

Although operation has been described here by means of an example of a normalized mutual-correlation, any index can be used if it has a large value near 1 with respect to a target signal and has small correlation with respect to interference. In contrast, the same effect can be expected even with an index having a large value near 1 with respect to interference and has small correlation with respect to a target signal.

When the normalized mutual-correlation is larger than the threshold, as the target signal is prevailing in the input signals and effect of the interference is small, a control signal for performing coefficient update is generated and supplied to the adaptive blocking matrix circuit 300. In contrast, as the target signal disturbs coefficient update of the multi-input canceller, a control signal for stopping the coefficient update of the multi-input canceller is generated and supplied to the multi-input canceller 500 (S54).

When the normalized mutual-correlation is smaller than the threshold, the adaptive blocking matrix circuit 300 stops coefficient update, generates a signal for performing coefficient update in the multi-input canceller, and supplies to the adaptive blocking matrix circuit 300 and the multi-input canceller 500, respectively (S54).

Further, it is also acceptable that the calculated value of the normalized mutual-correlation is converted to a gain which takes a large value when the target signal is prevailing to the interference and takes a small value when it is not the case, and is supplied to the adaptive blocking matrix circuit 300 and the multi-input canceller 500 (S54). However, this gain is assumed to be normalized to take a value in a rage between 0 and 1.

The adaptive blocking matrix circuit 300 and the multi-input canceller 500 can control speed and accuracy of coefficient update by replacing the product of the supplied gain and the coefficient update step size with a coefficient update step size (S55, S56). Instead of the normalized mutual-correlation, when using an index having a large value near 1 with respect to interference and has small correlation with respect to the target signal, the same effect can be achieved by using a ratio between the coefficient update step size and the supplied gain in place of the coefficient update step size. Consequently, it is possible to perform coefficient update control with higher accuracy than a control using a comparison result with the threshold.

In the multi-input canceller 500, a signal component correlated with a processed signal in the adaptive blocking matrix circuit 300 is removed from a signal generated by delay-processing (S58) a third array-processed signal acquired in the third array processing (S57) to thereby output an enhanced signal (S59).

FIG. 2 shows an exemplary configuration of the leakage blocking matrix circuit 330. In FIG. 2, the blocking matrix circuit 330 is configured of multipliers $331_1$~$331_{M-2}$, subtracters $332_0$~$332_{M-2}$, and an adder 333. The multipliers $331_1$~$331_{M-2}$ multiplies $g_i$ to $i^{th}$ (i is an integer from 1 to M−2) sensor signal $x_i(k)$, and outputs the product $g_ix_i(k)$. The subtracter $332_i$ (i is an integer from 0 to M−2) calculates a difference $z_i(k)=x_{M-1}(k)-g_ix_i(k)$ between the M−$1^{th}$ sensor signal $x_{M-1}(k)$ and an output of the multiplier $331_i$, and transmits to the adder 333. Here, i is an integer in a range from 1 to M−2. The subtracter $332_0$ calculates a difference $z_0(k)=x_{M-1}(k)-x_0(k)$ between the M−$1^{th}$ sensor signal $x_{M-1}(k)$ and the $0^{th}$ sensor signal $x_0(k)$, and transmits to the adder 333. The adder 333 adds all of the M−1 pieces of input signals, and outputs the addition result as $z_3(k)$. That is, $z_3(k)$ is given by the Expression (3).

[Expression 3]

$$z_3(k) = (M-1)x_{M-1}(k) - \sum_{m=1}^{M-2} g_m x_m(k) - x_0(k) \quad (3)$$

FIG. 3 shows an exemplary configuration of the leakage blocking matrix circuit 340. In FIG. 3, the blocking matrix circuit 340 is configured of multipliers $341_1$~$341_{M-2}$, subtracters $342_1$~$342_{M-1}$, and an adder 343. The multipliers $341_1$~$341_{M-2}$ multiplies $g_i$ to $i^{th}$ (i is an integer from 1 to M−2) sensor signal $x_i(k)$, and outputs the product $g_ix_i(k)$. The subtracter $342_i$ (i is an integer from 1 to M−1) calculates a difference $z_i(k)=x_0(k)-g_i x_i(k)$ between the $0^{th}$ sensor signal $x_0(k)$ and an output of the multiplier $341_i$, and transmits to the adder 343. Here, i is an integer in a range from 1 to M−2. The subtracter $342_{M-1}$ calculates a difference $Z_{M-1}(k)=x_0(k)-x_{M-1}(k)$ between the $0^{th}$ sensor signal $x_0(k)$ and the M−$1^{th}$ sensor signal $x_{M-1}(k)$, and transmits to the adder 343. The adder 343 adds all of the M−1 pieces of input signals, and outputs the addition result as $z_4(k)$. That is, $z_4(k)$ is given by the Expression (4).

[Expression 4]

$$z_4(k) = (M-1)x_0(k) - \sum_{m=1}^{M-2} g_m x_m(k) - x_{M-1}(k) \quad (4)$$

Assuming that the signal source is provided at a sufficiently distant, all signals incoming to a sensor can be expressed with reference to any one of the signals. Now, assuming that $x_0(k)$ is a reference signal, $x_i(k)$ can be expressed by the following expression.

[Expression 5]

$$x_i(k)=z^{-iD}x_0(k) \quad (5)$$

Here, $z^{-iD}$ is a delay corresponding to an interval between adjacent sensors. By applying the Expressions (5), (3) and (4), the Expressions (6) and (7) are established.

[Expression 6]

$$z_3(k) = x_0(k)\left\{(M-1)z^{-(M-1)D} - \sum_{m=1}^{M-2} g_m z^{-mD} - 1\right\} \quad (6)$$

[Expression 7]

$$z_4(k) = x_0(k)\left\{(M-1) - \sum_{m=1}^{M-2} g_m z^{-mD} - z^{-(M-1)D}\right\} \quad (7)$$

When the gains $G_3(k)$ and $G_4(k)$ of the leakage blocking matrix circuits 330 and 340 from the Expressions (6) and (7), the Expressions (8) and (9) are established.

[Expression 8]

$$G_3(k) = (M-1)z^{-(M-1)D} - \sum_{m=1}^{M-2} g_m z^{-mD} - 1 \quad (8)$$

[Expression 9]

$$G_4(k) = (M-1) - \sum_{m=1}^{M-2} g_m z^{-mD} - z^{-(M-1)D} \quad (9)$$

When applying to the Expression (8) and (9) conditions that both of the gains $G_3(k)$ and $G_4(k)$ of the leakage blocking matrix circuits 330 and 340 becomes G(k), the Expression (10) is established.

[Expression 10]

$$\sum_{m=1}^{M-2} g_m[z^{(m-M+1)D} + z^{(M-1-m)D}] = \sum_{m=1}^{M-2} g_m(z^{-mD} + z^{mD}) \quad (10)$$

In order that the Expression (10) is established,

[Expression 11]

$$g_m = g_{M-1-m} \quad (11)$$

has to be established.

This indicates that multiplier coefficients of the leakage blocking matrix circuits 330 and 340 are symmetrical. Further, as multiplying all multiplier coefficients by a constant is equal to multiplying outputs by a constant, the leakage blocking matrix circuits 330 and 340 may be configured to multiply $x_0(k)$ and $x_{M-1}(k)$ by a constant and then supply to a corresponding subtracter. If a planar wave is assumed, signals incoming from an orthogonal angle with respect to a sensor array are all equal. When applying the Expression (11) after the Expressions (3) and (4), and then applying the Expression (5) where D=0, $z_3(k)=z_4(k)$. That is, with respect to a signal incoming from the front, outputs of the leakage blocking matrix circuits 330 and 340 are equal.

Assuming that $g_m=g_L$ to all m with respect to the leakage blocking matrix circuits 330 and 340 shown in FIGS. 2 and 3, when the number of sensors is M, the gain G(i, θ) included in the Expression (2) is given by the following formula.

[Expression 12]

$$G(i, \theta) = \left\{ \begin{aligned} &[(M-1)^2 + 1 + (M-2)g_L^2] + \\ &\sum_{m=1}^{M-2}\left([2(M-2-m)g_L^2 + (4-2M)g_L]\cdot\cos\left[\frac{2\pi m i f_s}{N}t_0(\theta)\right]\right) - \\ &-2(M-1)\cdot\cos\left[\frac{2\pi(M-1)i f_s}{N}t_0(\theta)\right] \end{aligned} \right\}^{1/2} \quad (12)$$

As obvious from FIGS. 2 and 3, the leakage blocking matrix circuits 330 and 340 have symmetrical structures, and satisfy the Expression (11). Particularly, when $g_i=1$ (i is an integer from 1 to M−2), the leakage blocking matrix circuits 330 and 340 have the configurations shown in FIGS. 4 and 5, respectively. Due to the symmetric property of the structures, respective output signals $z_3(k)$ and $z_4(k)$ provide a large phase difference particularly in a low frequency with respect to interference incoming from a direction other than the front. Further, with respect to a target signal incoming from the front, $z_3(k)=z_4(k)=0$ is established. Accordingly, to the target signal, the normalized mutual-correlation between $z_3(k)$ and $z_4(k)$ becomes zero.

Originally, as the normalized mutual-correlation is need to be zero with respect to interference, the target signal and the interference are not distinguishable in this state. As such, $g_i \ne 1$ (i is an integer from 1 to M−2) is set. Such a value of $g_i$ causes $z_3(k)$ and $z_4(k)$ to leak the target signal to thereby prevent the normalized mutual-correlation from becoming zero.

The normalized mutual-correlation calculated by the correlation calculation section 920 using outputs of the leakage blocking matrix circuits 330 and 340 configured as described above generates a large difference with respect to the target signal and the interference, which enables to accurately distinguish the target signal and the interference using the normalized mutual-correlation. This means a target signal block where the target signal is prevailing and interference block where the interference is prevailing can be separated accurately. Further, instead of deciding (hard decision) one of the target signal block and the interference block, it is possible to continuously decide (soft decision) intermediate states between the both. Based on information of the target signal block and the interference block with high accuracy obtained in this manner, by controlling parameters determining the following property and operation accuracy of adaptive filters such as coefficient update step size and forgetting coefficient, coefficient update of the adaptive array processing device can be controlled appropriately. Consequently, a high quality array processing output less influenced by the frequency characteristics of input signals and directions of the target signal and the interference can be obtained.

FIGS. 6 and 7 shows second exemplary configurations of the leakage blocking matrix circuits 330 and 340. Compared with FIGS. 2 and 3, the sensor signals $x_{M-3}(k)$ and $x_2(k)$ are not used. Corresponding to this, the configuration does not include the multiplier $331_{M-3}$ and a subtracter $332_{M-3}$, and a multiplier $341_2$ and a subtracter $342_2$. In other words, each of the leakage blocking matrix circuits 330 and 340 may be configured such that a path corresponding to a pair of sensors having the widest interval has no multiplier, and other paths are symmetrically provided with a coefficient $g_i$ and a subtracter.

FIGS. 8 and 9 show third exemplary configurations of the leakage blocking matrix circuits 330 and 340. Compared with FIGS. 6 and 7, a sensor signal $x_0(k)$ is not used. When paying attention to sensor signals $x_1(k)$ to $x_{M-1}(k)$, the same configuration as that of FIGS. 6 and 7 is adopted. That is, the leakage blocking matrix circuits 330 and 340 may be configured such that one of signals corresponding to a pair of sensors having the widest interval is not used, and a path corresponding to a pair of sensors having a second widest interval do not have a multiplier, and other paths has a symmetric configuration in which coefficient $g_i$ and a subtracter are arranged.

FIGS. 10 and 11 show fourth exemplary configurations of the leakage blocking matrix circuits 330 and 340. Compared with FIGS. 8 and 9, a sensor signal $x_{M-1}(k)$ is not used. When paying attention to sensor signals $x_1(k)$ to $x_{M-2}(k)$, the same configuration as that of FIGS. 6 and 7 is adopted. That is, the leakage blocking matrix circuits 330 and 340 may be configured such that signals corresponding to a pair of sensors having the widest interval are not used, and a path corresponding to the closest pair of sensors interposed between them does not have a multiplier, and other paths has a symmetric configuration in which coefficient $g_i$ and a subtracter are arranged.

FIG. 12 shows a fifth exemplary configuration of the leakage blocking matrix circuit 330. In FIG. 12, the blocking matrix circuit 330 is configured of multipliers $331_1$ and $331_{i+1}$, and a subtracter $332_i$ (i is an integer from 1 to M−2). The multiplier $331_i$ multiplies $g_i$ by the $i^{th}$ sensor signal $x_i(k)$, and outputs the product $g_i x_i(k)$. The multiplier $331_{i+1}$ multiplies $g_{i+1}$ by the i+1$^{th}$ sensor signal $x_{i+1}(k)$, and outputs the product $g_{i+1} x_{i+1}(k)$. The subtracter $332_i$ calculates a difference $z_3(k)=g_{i+1}x_{i+1}(k)−g_i x_i(k)$ between an output of the multiplier $331_{i+1}$ and an output of the multiplier $331_i$, and outputs it. Note that when the conditions of the Expression (11) are applied, $g_{i+1}=g_i$ is established. Further, it is needless to say that such coefficients may be arranged after the subtracter $332_i$. The configuration of that case is the same as that shown in FIG. 23.

FIG. 13 shows a fifth exemplary configuration of the leakage blocking matrix circuit 340. In FIG. 13, the blocking matrix circuit 340 is configured of multipliers $341_i$ and $341_{i+1}$, and a subtracter $342_i$ (i is an integer from 1 to M−2). The multiplier $341_i$ multiplies $g_i$ by the $i^{th}$ sensor signal $x_i(k)$, and outputs the product $g_i x_i(k)$. The multiplier $341_{i+1}$ multiplies $g_{i+1}$ by the i+1$^{th}$ sensor signal $x_{i+1}(k)$, and outputs the product $g_{i+1} x_{i+1}(k)$. The subtracter $342_i$ calculates a difference $z_4(k)=g_i x_i(k)−g_{i+1}x_{i+1}(k)$ between an output of the multiplier $341_{i+1}$ and an output of the multiplier $341_i$, and outputs it. Note that when the conditions of the Expression (11) are applied, $g_i=g_{i+1}$ is established. Further, it is needless to say that such coefficients may be arranged after the subtracter $342_i$. The configuration of that case is the same as that shown in FIG. 23.

Five exemplary configurations regarding the leakage blocking matrix circuits 330 and 340 have been described. In these five exemplary configurations, the number of pairs of sensor signals combined via internal subtracters and corresponding sensor intervals are different. It is configured that outputs of all subtracters are set to have values which are close to zero with respect to a target signal incoming from the front. Outputs of the subtracters will not become zero with respect to interference incoming from a direction other than the target signal. In other words, each of the subtracter outputs functions as a blocking matrix circuit independently. However, each of the subtracter outputs has different frequency response and spatial selective characteristics. This is due to the following two grounds.

First, a relative delay between two sensor signals which are subtracter inputs is given in a form that a product of a distance between sensors and sine of the signal incoming direction is divided by sound velocity. Further, distances between sensors are different in all subtracter outputs. The frequency characteristics and spatial selective characteristics of subtracter outputs become functions of distances between sensors. This means, in turn, subtracter outputs corresponding to different distances between sensors have different frequency characteristics and spatial selective characteristics. This is correct even if subtracters and adders are exchanged. However, the different point is that a gain becomes an inverse number of a gain of a subtracter. In the case of using an adder, a target signal is enhanced. The frequency characteristics and directivity in that case are disclosed in FIG. 1.1 of Non-Patent Document 1.

In the case of subtracters, it is clearly understood that it is only necessary to take inverse numbers of the characteristics shown in FIG. 1.1 and normalizing them. Referring to FIG. 1.1, if distances between sensors are constant, it is found that the directivity becomes steeper as the input signal frequency becomes higher. In a low frequency, the beam angle is wide, and the directivity deteriorates. If applying this to the case of the subtracters, in a low frequency, the sensitivity is low with respect to a target signal incoming from the front direction, and the sensitivity is high with respect to a direction off the front. However, transition from the direction of low sensitivity to the direction of high sensitivity is slow, so sufficient directivity cannot be achieved. On the other hand, if a sensor interval becomes wider, a relative delay becomes larger, so steep directivity can be achieved.

According to this principle, in the five exemplary configurations regarding the leakage blocking matrix circuits 330 and 340, a plurality of differences between signals acquired from pairs of sensors having different intervals are calculated, and by adding them, blocking matrix circuits having comprehensively excellent directivity are acquired. With this configuration, differences between signal pairs obtained from sensors of wide intervals act effectively with respect to low-frequency signals, and differences between signal pairs obtained from sensors of narrow intervals act effectively with respect to high-frequency signals, and excellent directivity can be realized with respect to wide-band signals. As such, the leakage blocking matrix circuits 330 and 340 can suppress the target signal with excellent frequency characteristics and directivity. In the five exemplary configurations, as different subtracter outputs are used respectively, different directivity can be realized. Of course, the directivity is more excellent as the number of types of substrate outputs is larger, and the order is exemplary configuration 1, 2, 3, 4, and 5.

A common aspect of blocking matrix circuits configuring those pairs is that the structure is symmetry and a gain with respect to the front is equal. This has been shown in Expression (11). As such, outputs are equal with respect to a target signal, and a phase difference between outputs with respect to interference becomes a value close to 180 degrees. Accordingly, the correlation between these blocking matrix circuit outputs is large with respect to a target signal, and is small with respect to interference. As long as these characteristics are held, the blocking matrix circuits configuring these pairs may take any structures. For example, the configuration of the blocking matrix circuits 330 and 340 can be the one in which a plurality of blocking matrix circuits corresponding to a plurality of sensor intervals are combined. In this example, null can be formed in the target signal direction by adjusting the filter characteristics in the filter-and-sum beamformer described above. Array processing for forming such null is performed respectively for a plurality of times corresponding to a plurality of sensor intervals, and the results can be combined.

Second Exemplary Embodiment

FIG. 14 shows a block diagram of an adaptive array device having an adaptive array control device according to a second exemplary embodiment of the invention. The second exemplary embodiment is configured such that in the adaptive array control device of the first exemplary embodiment shown in FIG. 1, a filter 334 is provided between the leakage blocking matrix circuit 330 and the correlation calculation section 920, and a filter 344 is provided between the leakage blocking matrix circuit 340 and the correlation calculation section 920.

The filters 334 and 344 are designed in which a frequency such that the directivity defined by the leakage blocking matrix circuits 330 and 340, in particular, attenuation characteristics with respect to a distance other than the front, becomes flat with respect to a direction is set to be a passband. With the filters 334 and 344 being provided, correlation calculated by the correlation calculation section 920 with use of output signals of these filters cause large difference with respect to a target signal and interference, so that separation of the target signal and interference using correlation can be performed accurately. This means a target signal block where the target signal is prevailing and interference block where interference is prevailing can be separated accurately. Other operations and their effects are the same as those of the first exemplary embodiment which has been described using FIG. 1.

In the above description, a value of a parameter $g_i$ in the first and second exemplary embodiments has not been discussed. However, it has been described that in order that output signals of the leakage blocking matrix circuits 330 and 340 become zero with respect to the target signal, the value has to be other than 1. As such, if $g_i \ne 1$, it is understood that the value of $g_i$ is preferably around 1 in order to cause a large phase difference. Actually, when calculating a normalized mutual-correlation with an assumption that a signal coming to the sensor is a white signal, it becomes a function of a phase difference ø of true SIR ρ, a signal incoming direction θ, and output signals of the leakage blocking matrix circuits 330 and 340.

When calculating gains and phases of the leakage blocking matrix circuits 330 and 340 with an assumption that the range of signal incoming direction θ is 30 to 90 degrees, the signal band is 500 to 1500 Hz, and the number of sensors is 4, a normalized mutual-correlation γ hat can be plotted with respect to a particular SIR ρ. In the case of the signal incoming direction θ being on the horizontal axis and the normalized mutual-correlation γ hat being plot on the vertical axis with respect to ρ=0 dB and ρ=∞dB, FIG. 15 is obtained. As it is preferable that a single γ hat is determined with respect to θ of wide range, the locus of a γ hat value is preferable near horizon.

Further, ranges of γ hats corresponding to ρ=0 dB and ρ=−∞dB have not to be overlapped each other. This is for obtaining clearly different γ hats for ρ=0 dB in which target signal and interference is combined at the almost same ratio and for ρ=−∞dB in which the power of interference is overwhelmingly higher with respect to a target signal. When plotting a γ hat with respect to $g_i$ near 1 in these conditions, the optimum value of $g_i$ is 0.92. FIG. 15 shows a locus of a γ hat acquired with respect to the optimum value $g_i$=0.92 in the above conditions, provided that the passband of the filters 334 and 344 is set to be 500 to 1500 Hz in correspondence with the voice.

Third Exemplary Embodiment

FIG. 16 shows a block diagram of an adaptive array device having an adaptive array control device according to a third exemplary embodiment of the invention. The third exemplary embodiment is configured to further include a leakage blocking matrix circuit 350 and a filter 354, and a leakage blocking matrix circuit 360 and a filter 364, in addition to the leakage blocking matrix circuit 330 and the filter 334 and the leakage blocking matrix circuit 340 and the filter 344. The leakage blocking matrix circuit 360 is for providing an effect to a high-range signal with respect to the leakage blocking matrix circuit 330 acting mainly on a low-range signal by the filter 334.

As such, the passband of the filter 364 is set to be higher than the passband of the filter 334 and to cover wider frequency bands when the passbands of the filters 334 and 364 are combined. That is, the processing performed by the leakage blocking matrix circuit 330 in the first exemplary embodiment is to be performed by the leakage blocking matrix circuits 330 and 360 for respective frequency bands. An output of the filter 364 is transmitted to the multiplier 365. The multiplier 365 enhances a high-frequency component so as to almost equal the power of an output of the filter 364 and the power of an output of the filter 334. For example, if a signal band to be input to a sensor is 8 kHz, a coefficient of the multiplier 365 can be set to be around 3. An output of the multiplier 365 is transmitted to the adder 336, and is added to the output of the filter 334. The addition result is supplied to the correlation calculation section 920.

Similarly, the leakage blocking matrix circuit 350 is for providing an effect to a high-range signal with respect to the leakage blocking matrix circuit 340 mainly acting on a low-range signal by the filter 344. As such, the passband of the filter 354 is set to be higher than the passband of the filter 344 and cover wider frequency bands when the filters 344 and the 354 are combined. An output of the filter 354 is transmitted to the multiplier 355. The multiplier 355 enhances a high frequency component so as to almost equal the power of an output of the filter 354 and the power of an output of the 344. Accordingly, the coefficient of the multiplier 355 can be the same value as the coefficient of the multiplier 365. An output of the multiplier 355 is transmitted to the adder 346, and is added to an output of the filter 344. The addition result is supplied to the correlation calculation section 920.

With the leakage blocking matrix circuits 350 and 360 and the filters 354 and 364, as a signal component of a frequency band which has not been used when they were not present can be used, a mutual-correlation calculated by the correlation calculation section 920 causes a large difference between a target signal and interference, so that distinction between the target signal and the interference using mutual-correlation can be performed accurately. This means a target signal block where a target signal is prevailing and interference block where interference is prevailing can be distinguished separately. Other operations and their effects are the same as those of the first exemplary embodiment which has been described using FIG. 1.

As obvious from the above description, the leakage blocking matrix circuits 350 and 360 have symmetric configurations and the same $g_i$ value, which is the same as the leakage blocking matrix circuit 330 and 340. FIGS. 17 and 18 show examples of a phase difference ø of an output signal caused by the combination of the leakage blocking matrix circuits 330 and 340, and a phase difference ø of an output signal caused by the combination of the leakage blocking matrix circuits 350 and 360, respectively. It is calculated that the number of sensors is 4, and the signal band is 8,000 Hz, and the vertical axis is indicated as cosine (COS ø) of a phase difference ø. From these drawings, it is found that when the signal incoming direction DOA is close to 0, the cosine value is 1 regardless of the frequency. This corresponds to the target signal.

On the other hand, if the signal incoming direction is distant from 0, the cosine value is −1 in only a specific frequency band. This corresponds to interference. The frequency bands where the cosine value becomes −1 are different in FIGS. 17 and 18, and the central frequency is about 1,000 Hz in FIG. 17, and is about 3,000 Hz in FIG. 18. That is, a frequency band where the normalized mutual-correlation becomes −1 with respect to interferences is higher in FIG. 18. Accordingly, by processing outputs of the leakage blocking matrix circuits 330 and 340 and outputs of the leakage blocking matrix circuits 350 and 360 by bandpass filters which pass corresponding frequency bands respectively, a phase difference between a pair of leakage blocking matrix circuit outputs can be calculated as an index which becomes 1 with respect to a target signal and becomes −1 with respect to interference.

In the third exemplary embodiment described using FIG. 16, an input signal to the correlation calculation section 920 has been calculated using two pairs of leakage blocking matrix circuits. However, it is clearly understood that the number of pairs of leakage blocking matrix may be increased. Next, a method of designing a leakage coefficient $g_i$ in a leakage blocking matrix circuit in the case that there are a plurality of pairs of leakage blocking matrix circuits will be described.

FIG. 10 is a flowchart showing a design procedure of a leakage coefficient $g_i$ in a leakage blocking matrix circuit.

First, a signal band which is to be processed by a pair of object leakage blocking matrix circuits and a minimum value θ min of a signal incoming direction (DOA) θ considered as interference are designated (S101). Next, a leakage coefficient $g_i$ considered as appropriate is set (S102). According to these settings, the γ hat when the actual power ratio (SIR) ρ of the target signal to the interference is 0 dB is calculated using the Expression (2) with respect to θ which is larger than θmin and smaller than 90 degrees (S103). The gain G (i, θ) in the Expression (2) can be calculated corresponding to the configuration of the leakage blocking matrix circuit if the circuit is determined. The gain in the case of using the configurations shown in FIGS. 2 and 3 becomes the one shown in the Expression (12). Similarly, the γ hat when ρ is ∞dB is calculated with respect to θ which is larger than θmin and smaller than 90 degrees.

It is checked whether or not the loci cross each other when these ρ are shown as in FIG. 15 (S104). When they cross each other, the signal incoming direction (DOA) θ corresponding to a node corresponds to both ρ=0 dB and ∞dB, so it is impossible to distinguish a state where the power of a target signal and the power of interference is almost equal and a state where the power of a target signal is overwhelmingly higher than the power of interference. As this phenomenon is caused by the value of a leakage coefficient $g_i$ which has been set primarily, the processing so far is again performed using another leakage coefficient $g_i$. If no locus crosses each other, the leakage coefficient $g_i$ and data of the γ hat corresponding to ρ=0 dB is stored (S105).

Here, if evaluation is performed with another leakage coefficient $g_i$, the procedure up to this point is repeated from the start (S106). Up to this point, data of γ hat corresponding to at least one leakage coefficient $g_i$ have to be obtained. Further, if data of γ hat corresponding to a plurality of leakage coefficients $g_i$ are obtained up to this point, one value is selected. This selection is performed in the following procedure.

First, it is checked whether there is a leakage coefficient $g_i$ in which the polarity of γ min hat and the polarity of γ max hat is opposite (S107). Here, γ min hat and γ max hat are the minimum value and the maximum value of γ hat respectively obtained when changing θ with ρ=0 dB. When such a leakage coefficient $g_i$ is present, a leakage coefficient $g_i$ in which the absolute value of the average of γ min hat and γ max hat becomes the minimum is selected (S108). This indicates that γ hat obtained when changing θ with ρ=0 dB is distributed around zero, and the accuracy of calculating ρ from γ hat can be high.

If there is no leakage coefficient $g_i$ satisfying the above conditions, $g_i$ where distribution with respect to θ of γ hat when ρ=0 dB becomes the minimum is selected (S109).

By repeating the above procedures with respect to different frequency bands, a configuration having a plurality of pairs of leakage blocking matrix circuits can be designed. At this time, although respective frequency bands are selected in a manner of not overlapping each other basically, a serious problem will not be caused unless they overlap in an extremely large amount.

With a plurality of pairs of vertical connections of leakage blocking matrix circuits and filters being provided, signal components of frequency bands which have not been used when those pairs were not present can be used. As such, a mutual-correlation calculated by the correlation calculation section 920 causes a large difference between a target signal and interference, and distinction between the target signal and the interference using mutual-correlation can be performed accurately. This means that a target signal block where the target signal is prevailing and interference block where the interference is prevailing can be separated accurately. Other operations and their effects are the same as those of the first exemplary embodiment which has been described using FIG. 1.

Fourth Exemplary Embodiment

FIG. 20 is a block diagram showing an adaptive array device having an adaptive array control device according to a fourth exemplary embodiment of the invention. The fourth exemplary embodiment of the invention includes a computer (CPU; processor; data processing device) 1000 which operates in accordance with a program control, input terminals $101_0$ to $101_{M-1}$, and an output terminal 600. The computer (CPU; processor; data processing device) 1000 includes the fixed beamformer 200, the adaptive blocking matrix circuit 300, the delay element 400, the multi-input canceller 500, the leakage blocking matrix circuits 330 and 340, the correlation calculation section 920, and the comparator section 800. Further, the filters 334 and 344 may also be included. Furthermore, the leakage blocking matrix circuits 350 and 360, the filters 354 and 364, and the multipliers 355 and 365, and the adders 336 and 346 may also be included.

Target signals and interferences supplied to the input terminals $101_0$ to $101_{M-1}$ are supplied to the array processing device in the computer 1000 where the interferences are processed. The main components of the array processing device are the fixed beamformer 200, the adaptive blocking matrix circuit 300, the delay element 400, and the multi-input canceller 500. The adaptive mode control device including the leakage blocking matrix circuits 330 and 340, the correlation calculation section 920 and the comparator section 800 controls accuracy and coefficient updating speed of adaptive filters included in the adaptive blocking matrix circuit 300 and the multi-input canceller 500. The adaptive mode control device may also include the filters 334 and 344, and further, may include the leakage blocking matrix circuits 350 and 360, the filters 354 and 364, the multiplier 355 and 365, and the adders 336 and 346.

The adaptive mode control device performs two kinds of array processing, using outputs of a group of a plurality of sensors, such that gains with respect to a target signal are equal and a phase difference as a result of processing with respect to interference becomes near 180 degrees, and based on the correlation of these array processing results, a relative magnitude relationship between the target signal and the interference is estimated. As such, a coefficient updating control of the adaptive array processing device can be performed appropriately, so high-quality array processing outputs can be obtained. Further, the correlation not only indicates a relative magnitude relationship between the target signal and the interference, but also includes information regarding a signal incoming direction when assuming that an input signal is only one, that is, an incoming direction of a virtual signal. For example, if the phase difference is near 180 degrees, it means that the incoming direction of a virtual signal is shifted from the front to a right direction by about 90 degrees. At the same time, if the phase difference is 0, the incoming direction of the virtual signal is the front. Accordingly, with use of the correlation, a shift from the front of the signal incoming direction can be estimated.

Although description has been given above using microphones as sensors, sensors such as ultrasonic sensors, sonar receivers, and antennas may be used instead of microphones.

INDUSTRIAL APPLICABILITY

According to the present invention, a coefficient updating control of an adaptive array processing device can be performed appropriately, so that it is possible to obtain high-quality array processing outputs which is less influenced by the frequency characteristics of input signals and directions of a target signal and interference. Accordingly, it is possible to enhance and receive only a specific signal from among a plurality of signal sources. This method is widely applicable to acquisition of audio signals by adaptive microphone array, and wireless transmission-reception devices by means of sonar and adaptive antenna array in the hydroacoustic field, providing large effects on businesses of those fields.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2006-117288, filed Apr. 20, 2006, the disclosure of which is incorporated herein in its entirety by reference.

Figure 1:
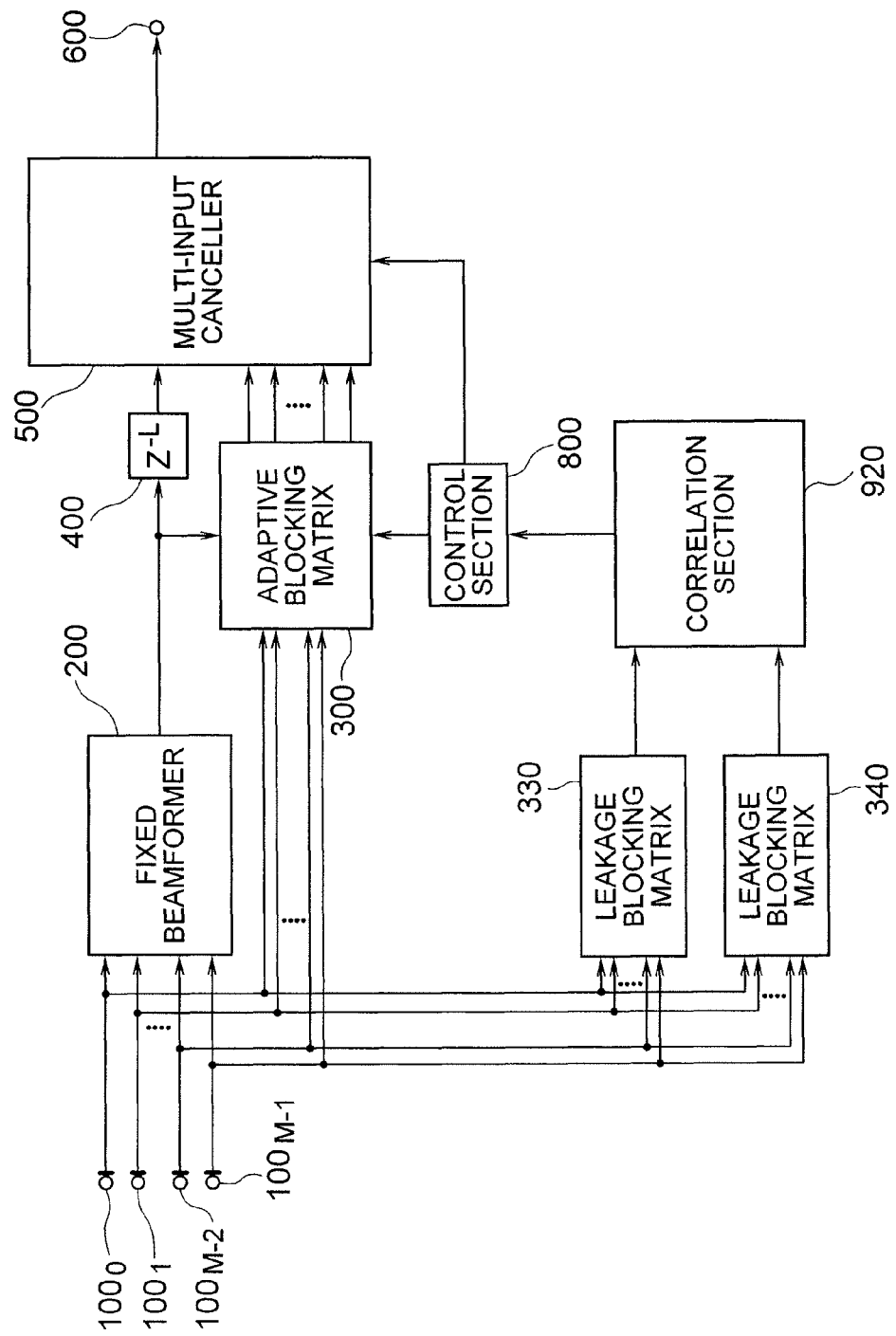
FIG. 1 is a block diagram showing an adaptive array device having an adaptive array control device according to a first exemplary embodiment of the invention.
Figure 2:
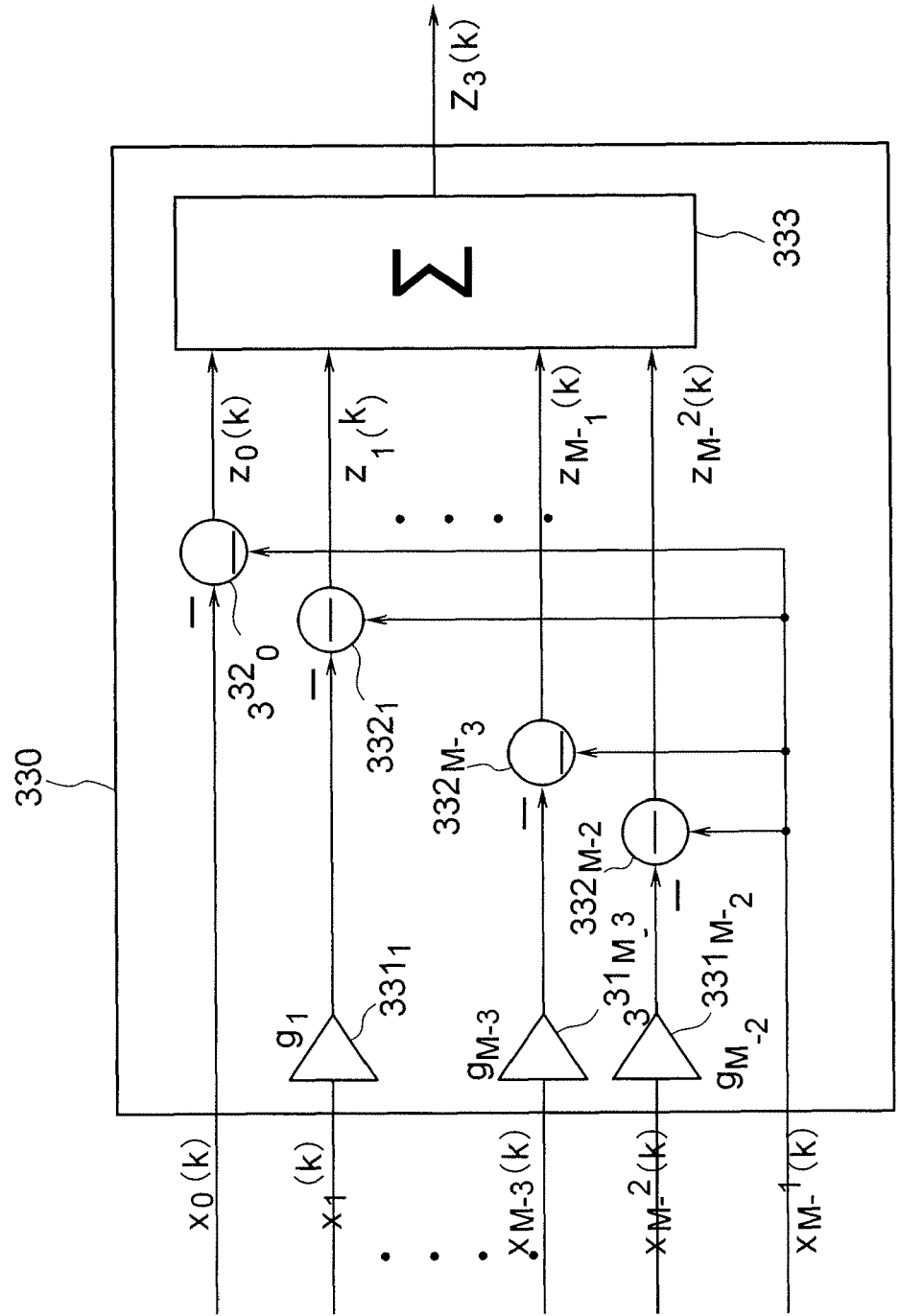
FIG. 2 is a block diagram showing an exemplary configuration of the leakage blocking matrix circuit 330.
Figure 3:
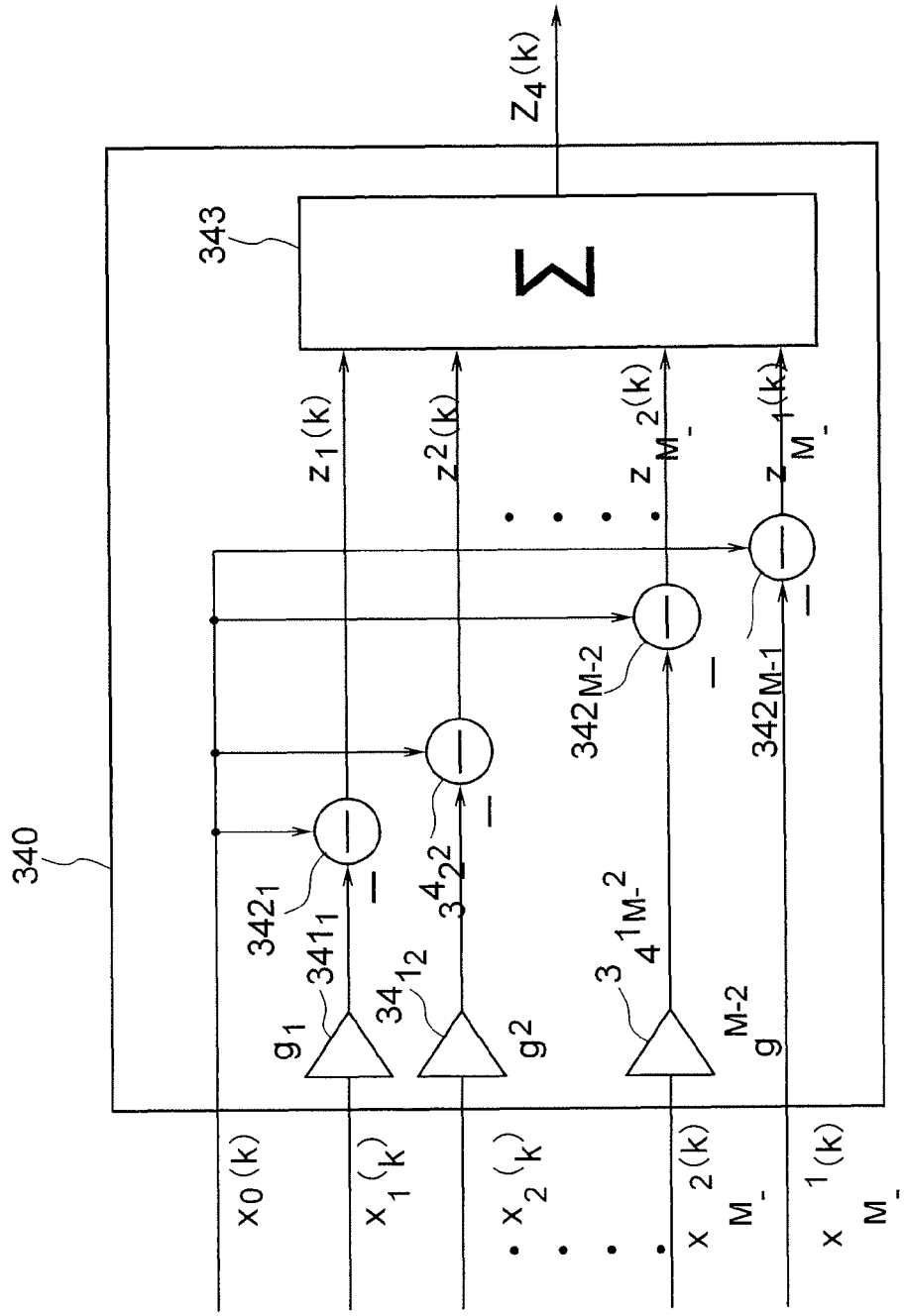
FIG. 3 is a block diagram showing an exemplary configuration of the leakage blocking matrix circuit 340.
Figure 4:
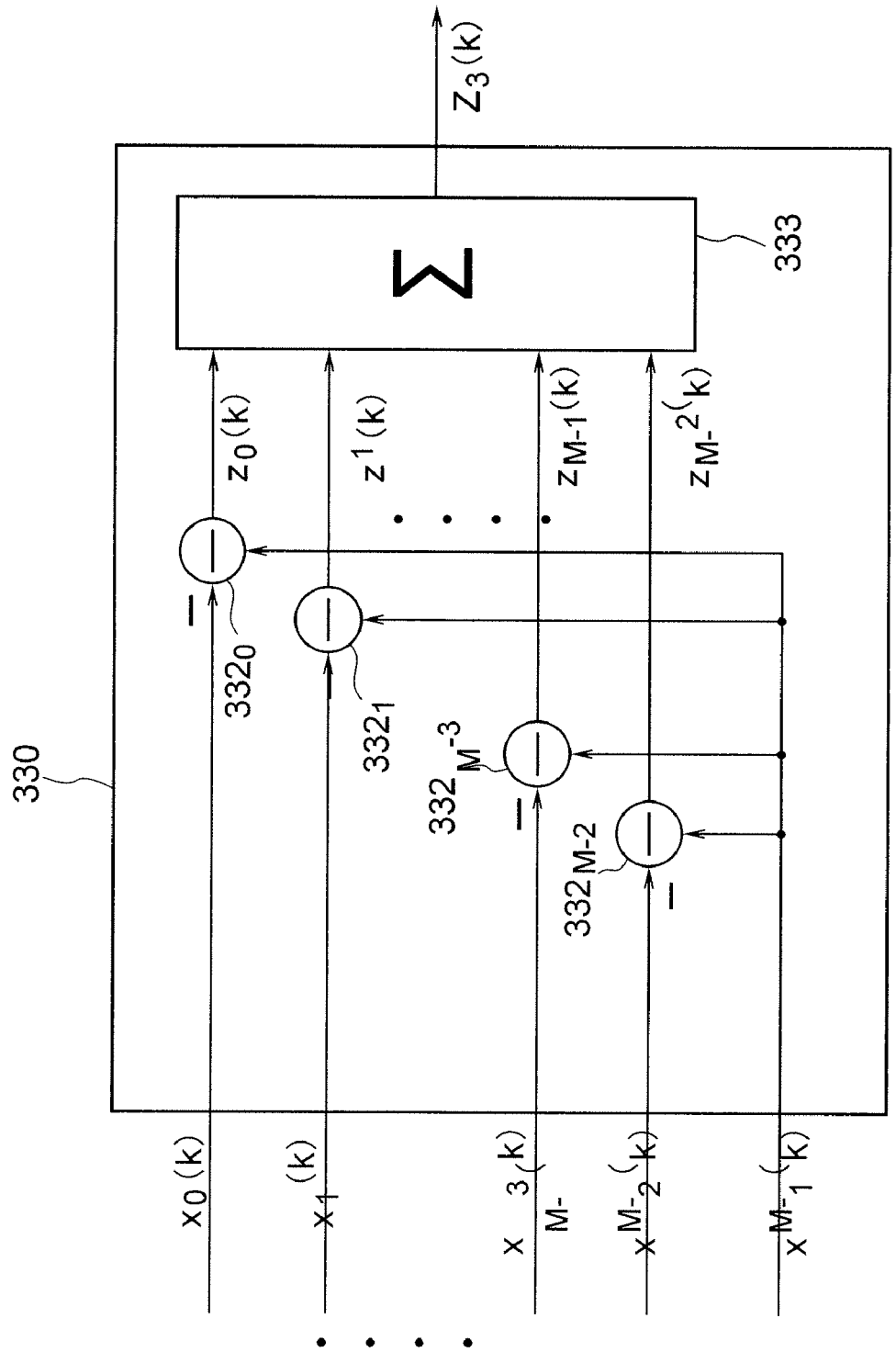
FIG. 4 is a block diagram showing an exemplary configuration in which leakage of the leakage blocking matrix circuit 330 is zero.
Figure 5:
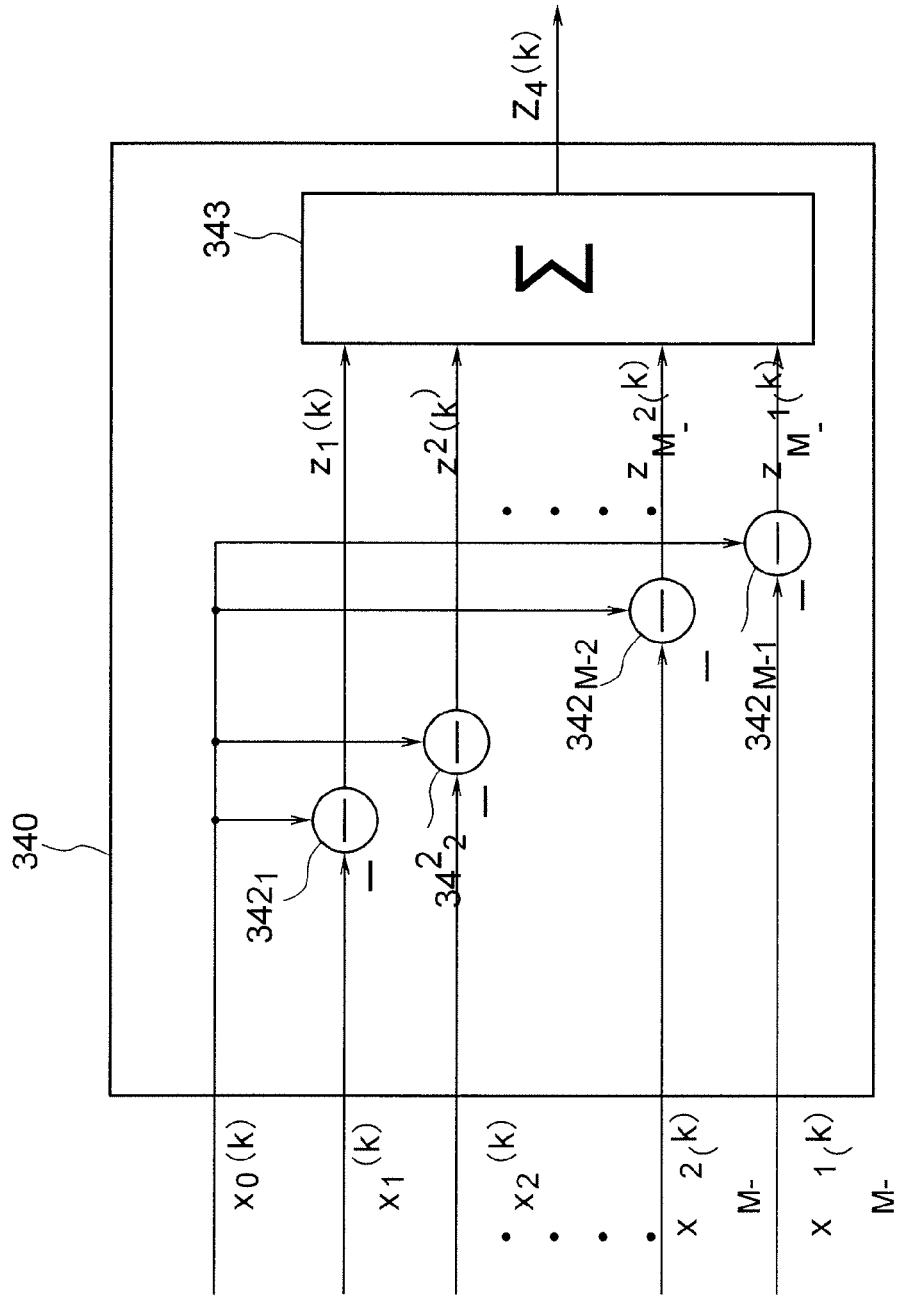
FIG. 5 is a block diagram showing an exemplary configuration in which leakage of the leakage blocking matrix circuit 340 is zero.
Figure 6:
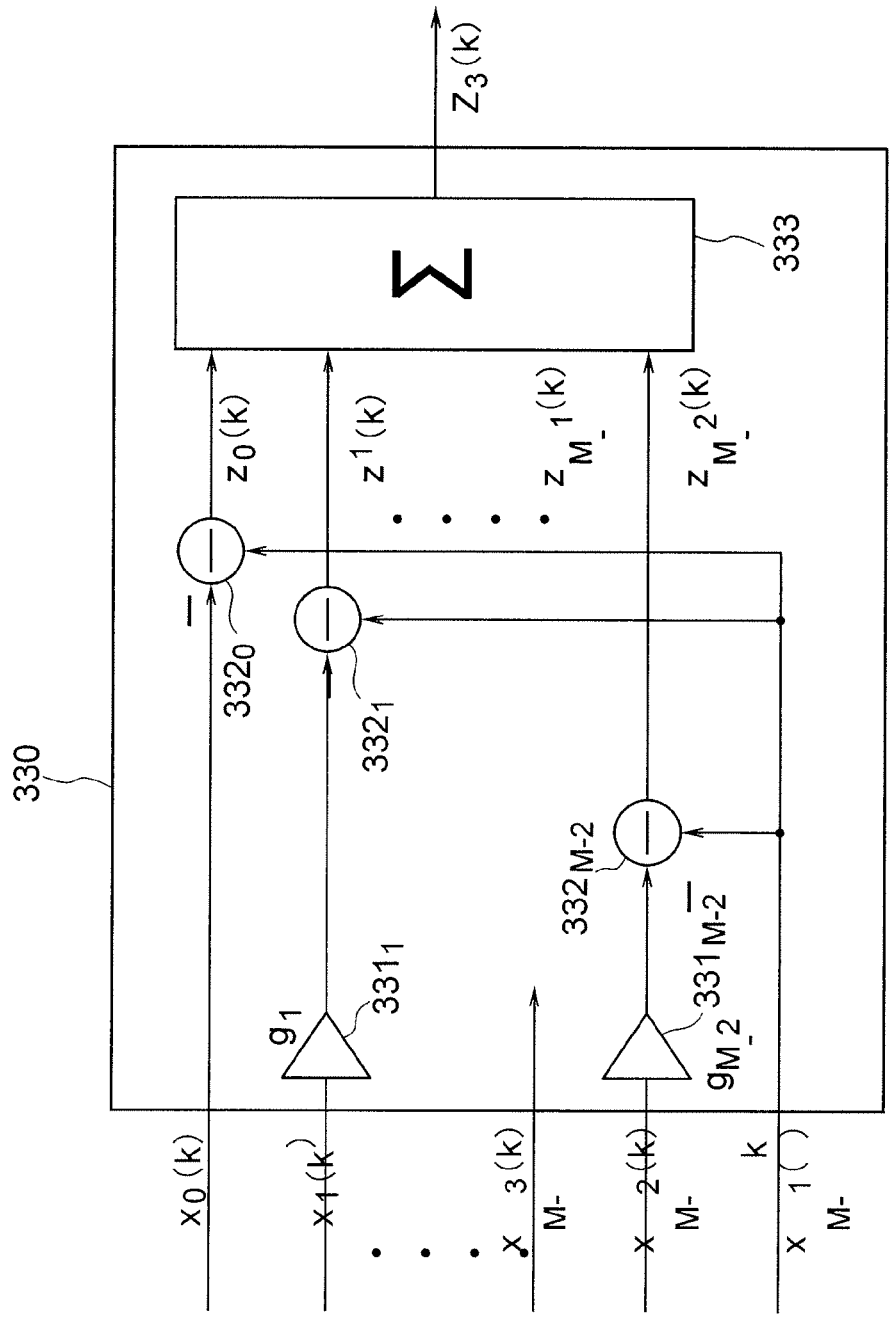
FIG. 6 is a block diagram showing a second exemplary configuration of the leakage blocking matrix circuit 330.
Figure 7:
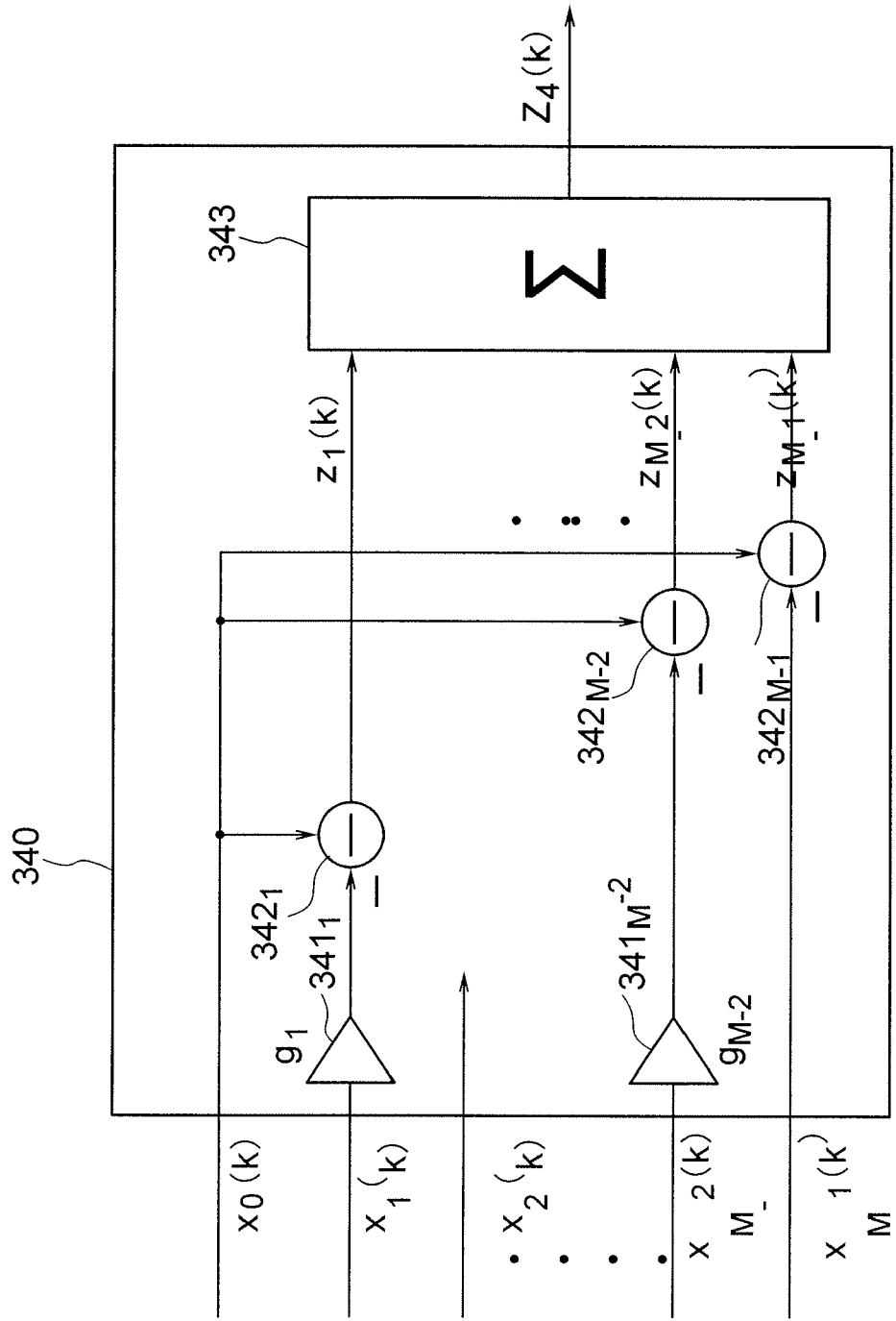
FIG. 7 is a block diagram showing a second exemplary configuration of the leakage blocking matrix circuit 340.
Figure 8:
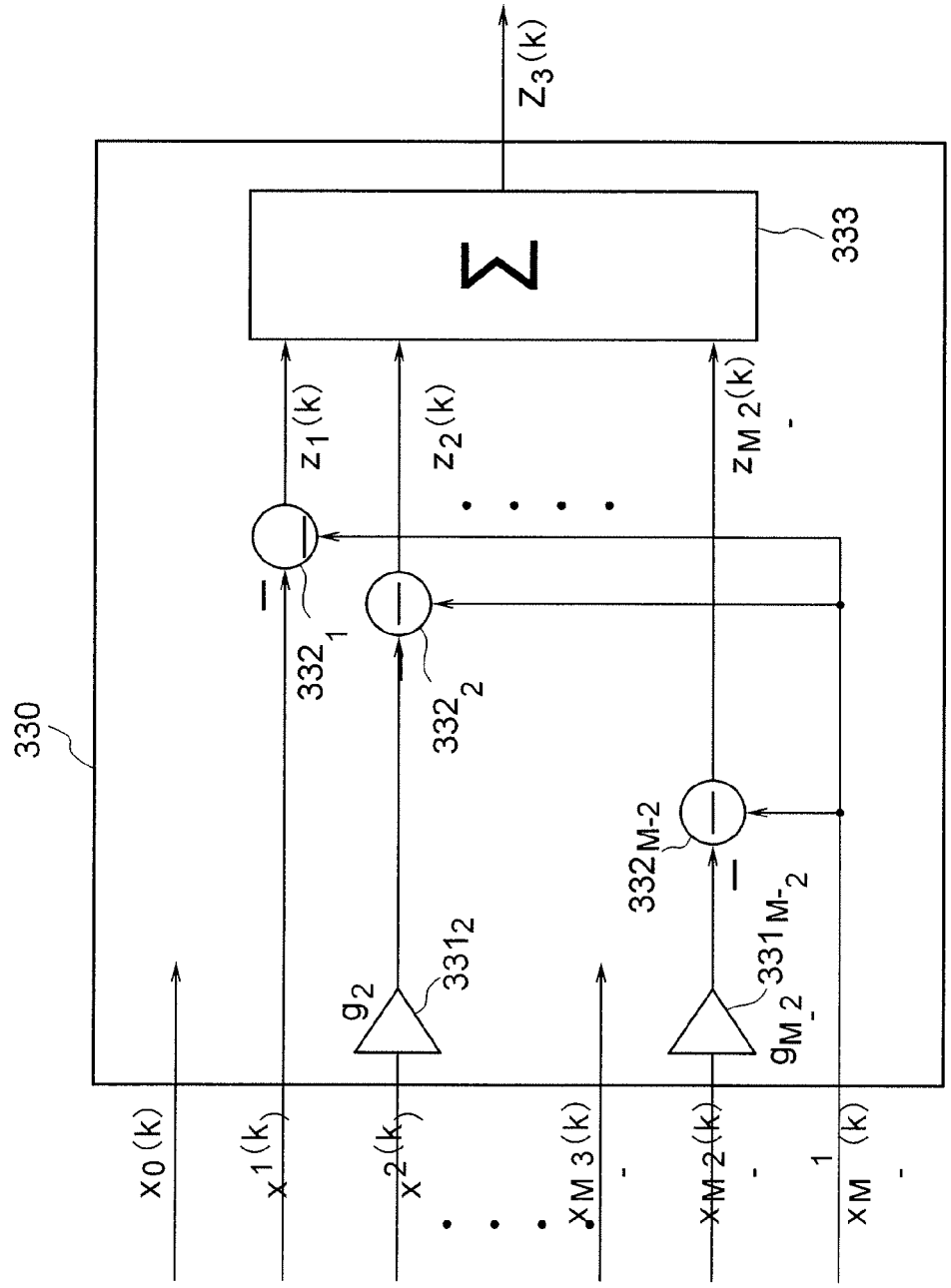
FIG. 8 is a block diagram showing a third exemplary configuration of the leakage blocking matrix circuit 330.
Figure 9:
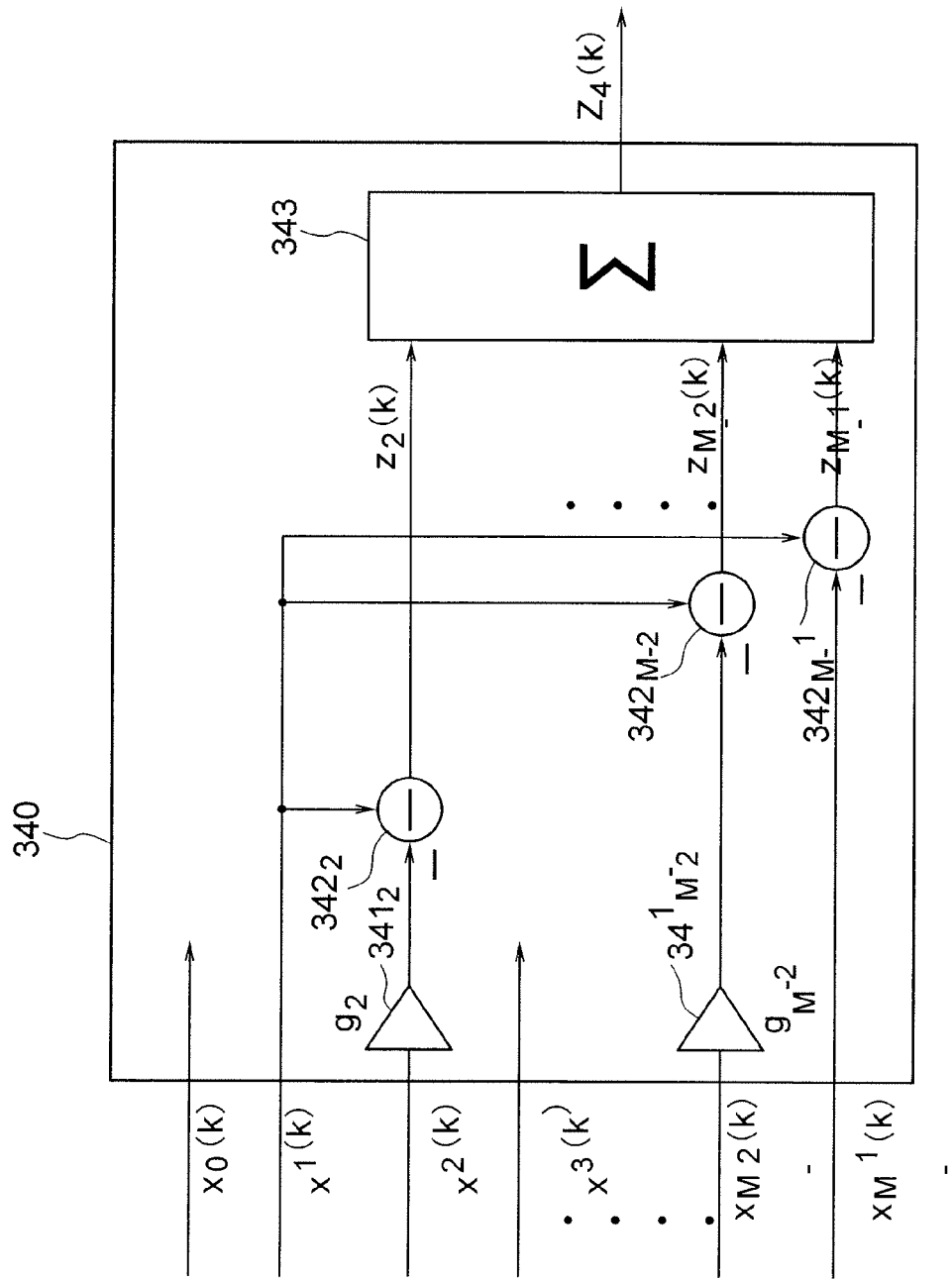
FIG. 9 is a block diagram showing a third exemplary configuration of the leakage blocking matrix circuit 340.
Figure 10:
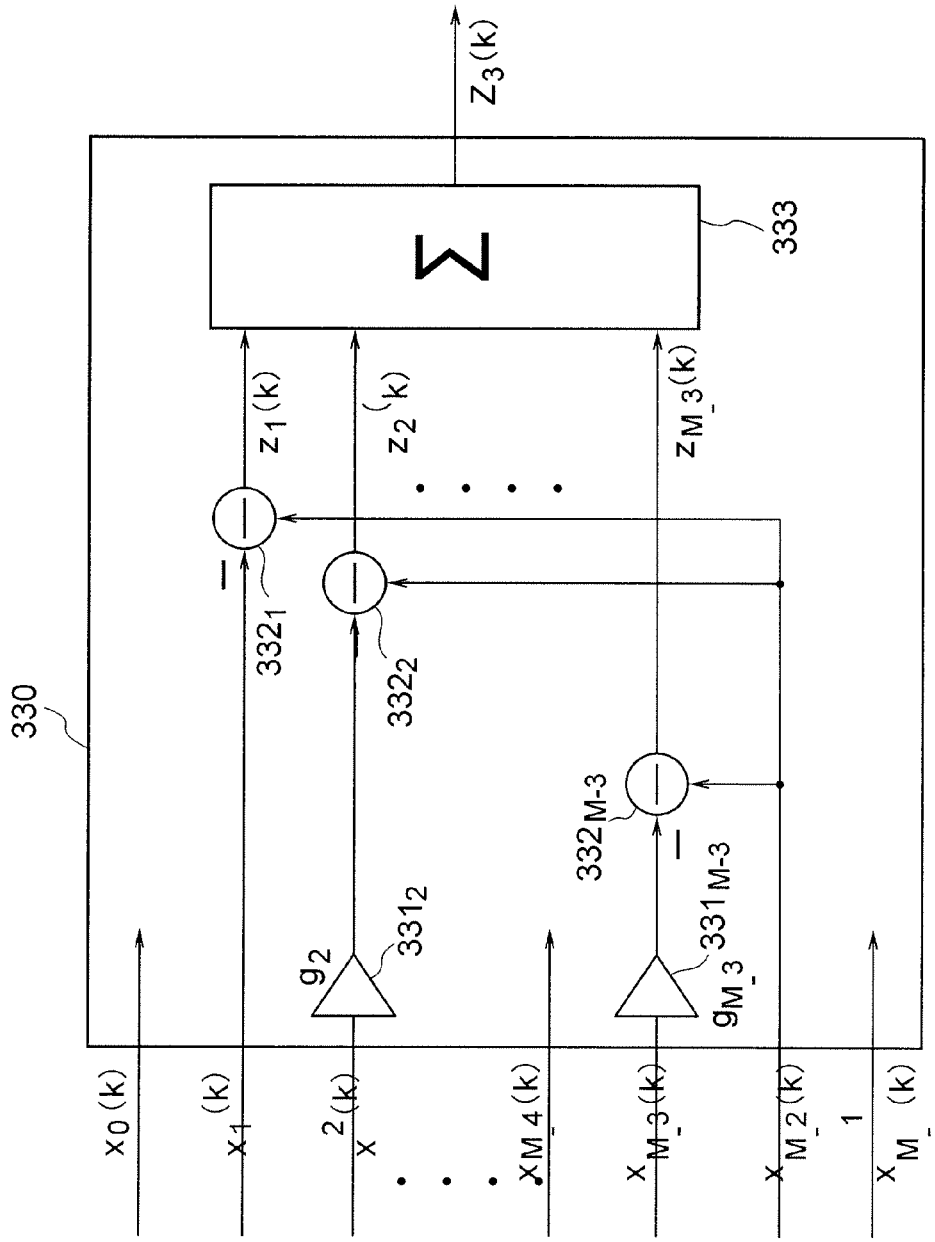
FIG. 10 is a block diagram showing a fourth exemplary configuration of the leakage blocking matrix circuit 330.
Figure 11:
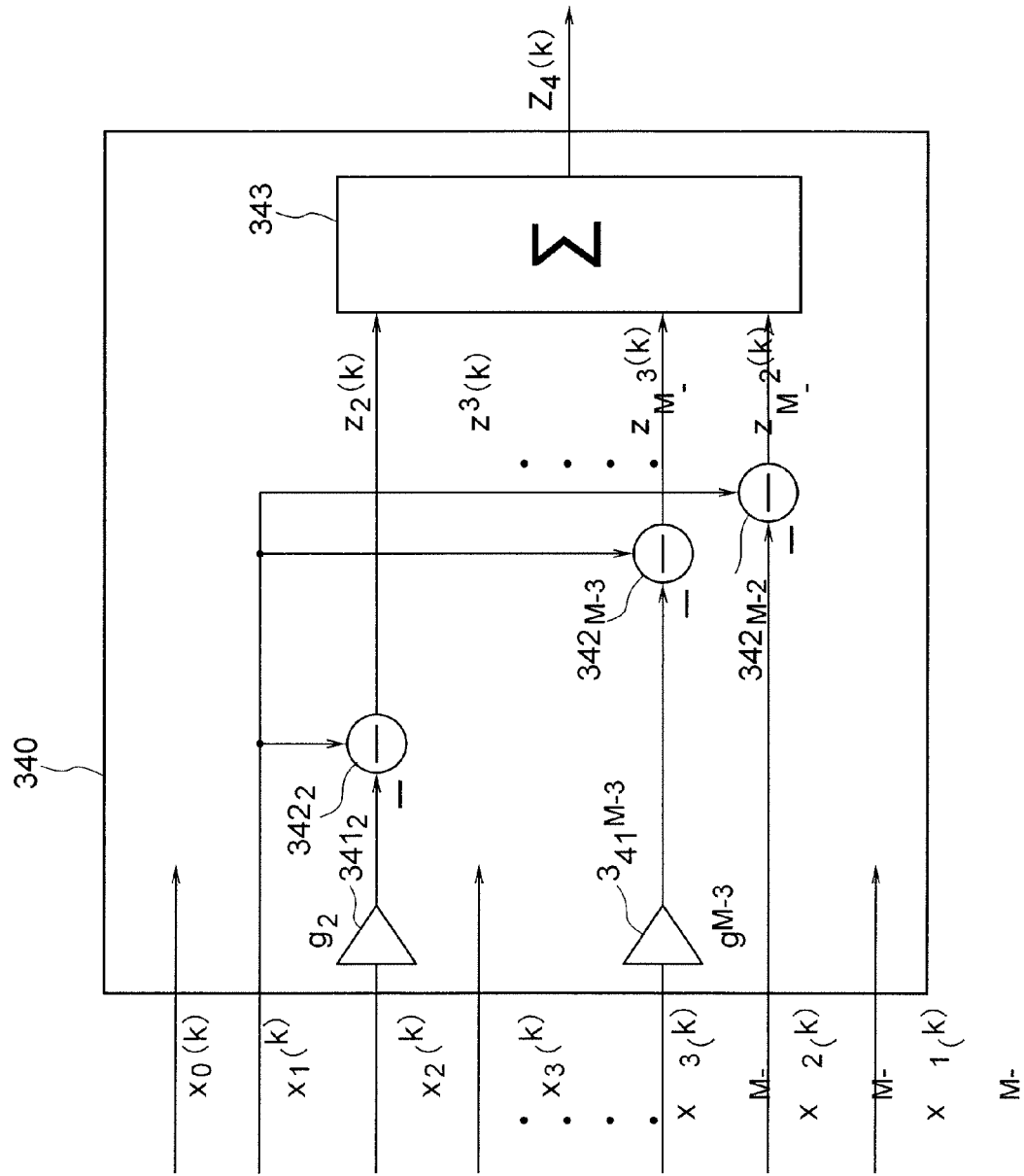
FIG. 11 is a block diagram showing a fourth exemplary configuration of the leakage blocking matrix circuit 340.
Figure 12:
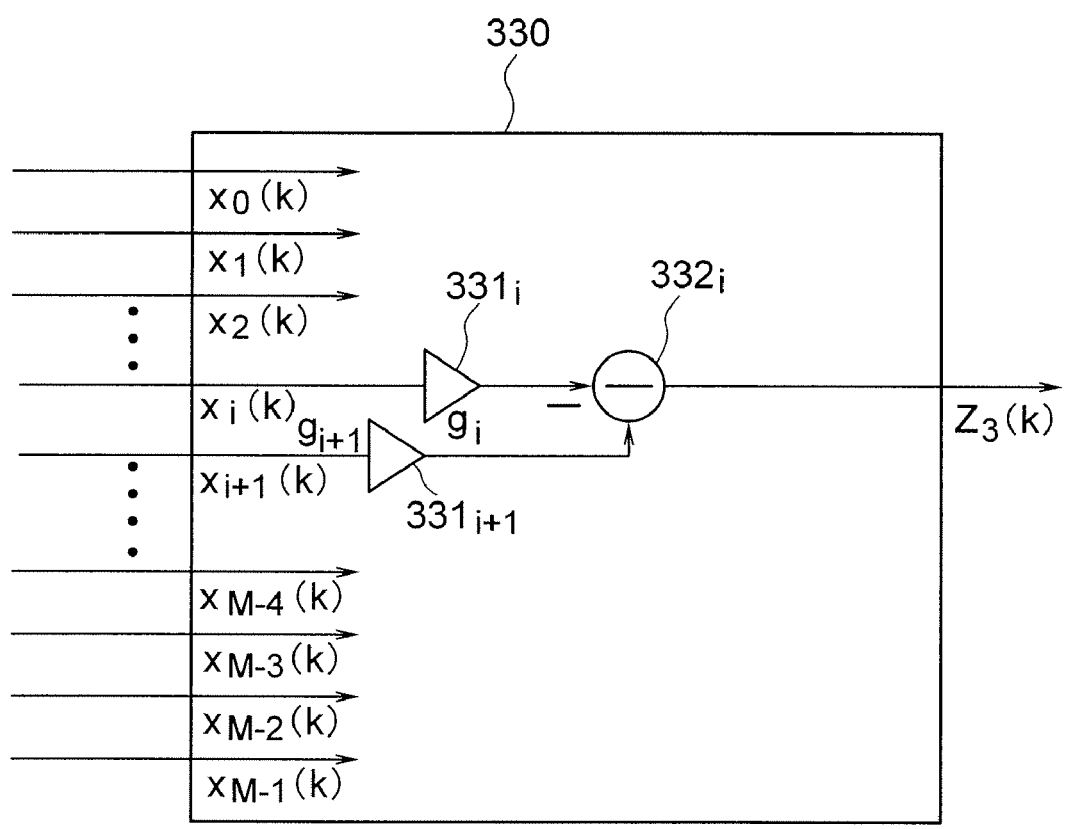
FIG. 12 is a block diagram showing a fifth exemplary configuration of the leakage blocking matrix circuit 330.
Figure 13:
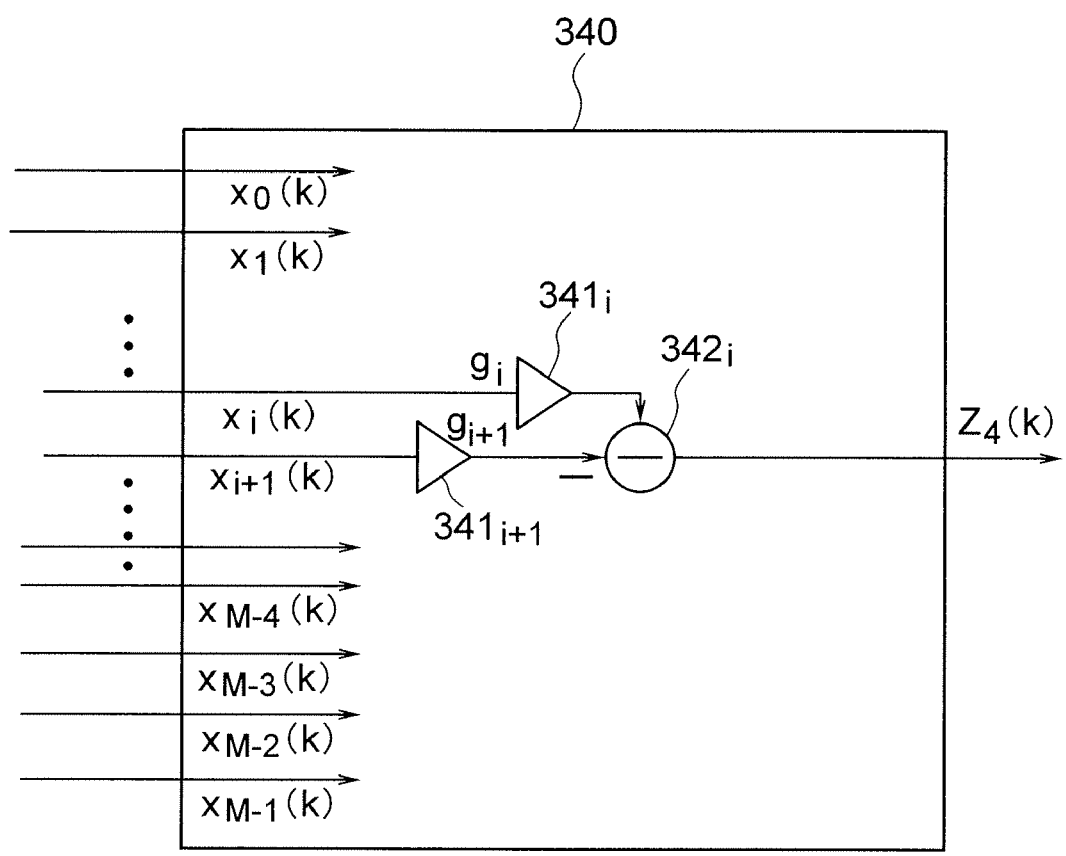
FIG. 13 is a block diagram showing a fifth exemplary configuration of the leakage blocking matrix circuit 340.
Figure 14:
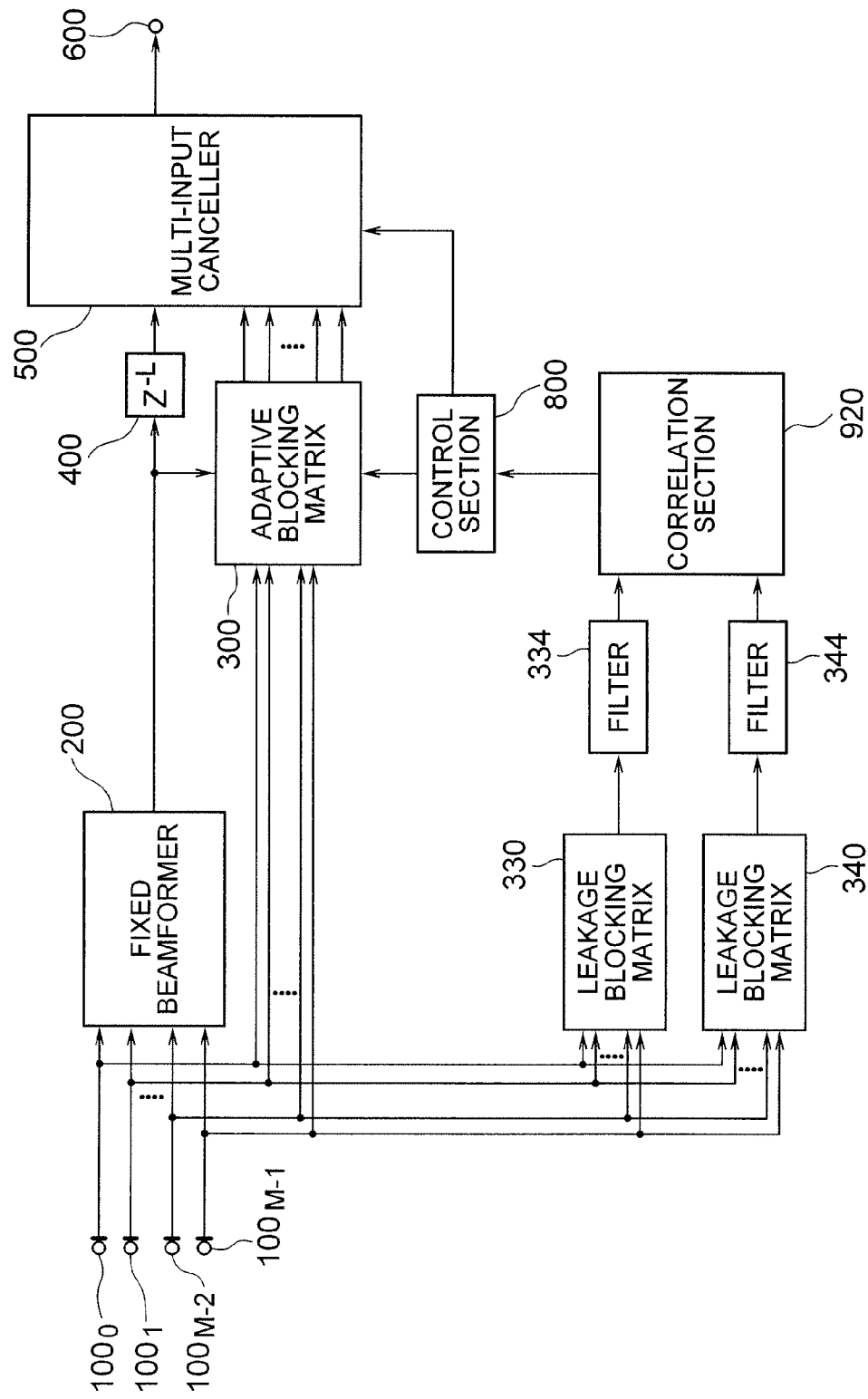
FIG. 14 is a block diagram showing an adaptive array device having an adaptive array control device according to a second exemplary embodiment of the invention.
Figure 15:
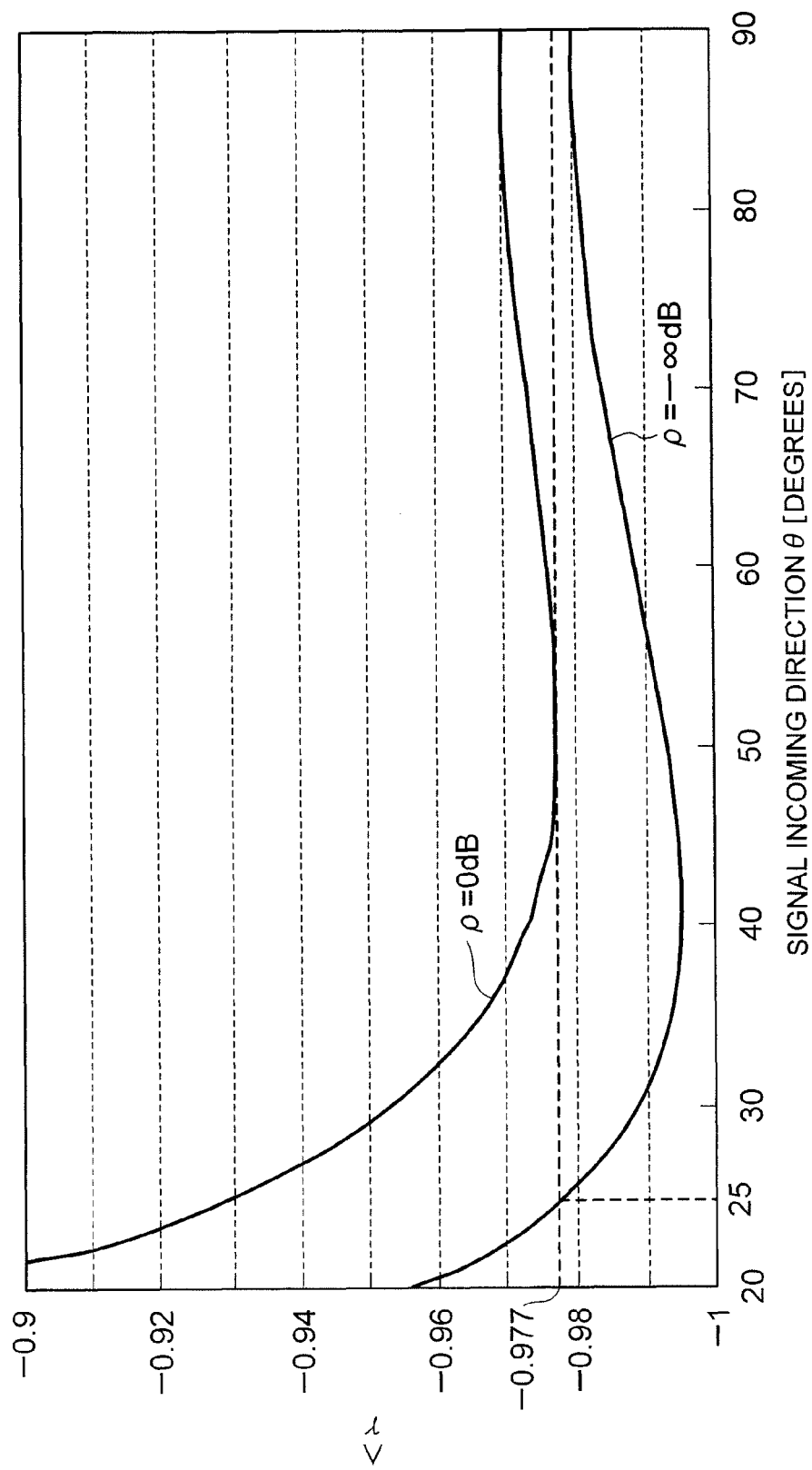
FIG. 15 is a graph showing a signal incoming direction and a normalized mutual-correlation with respect to a plurality of signal to interference ratio.
Figure 16:
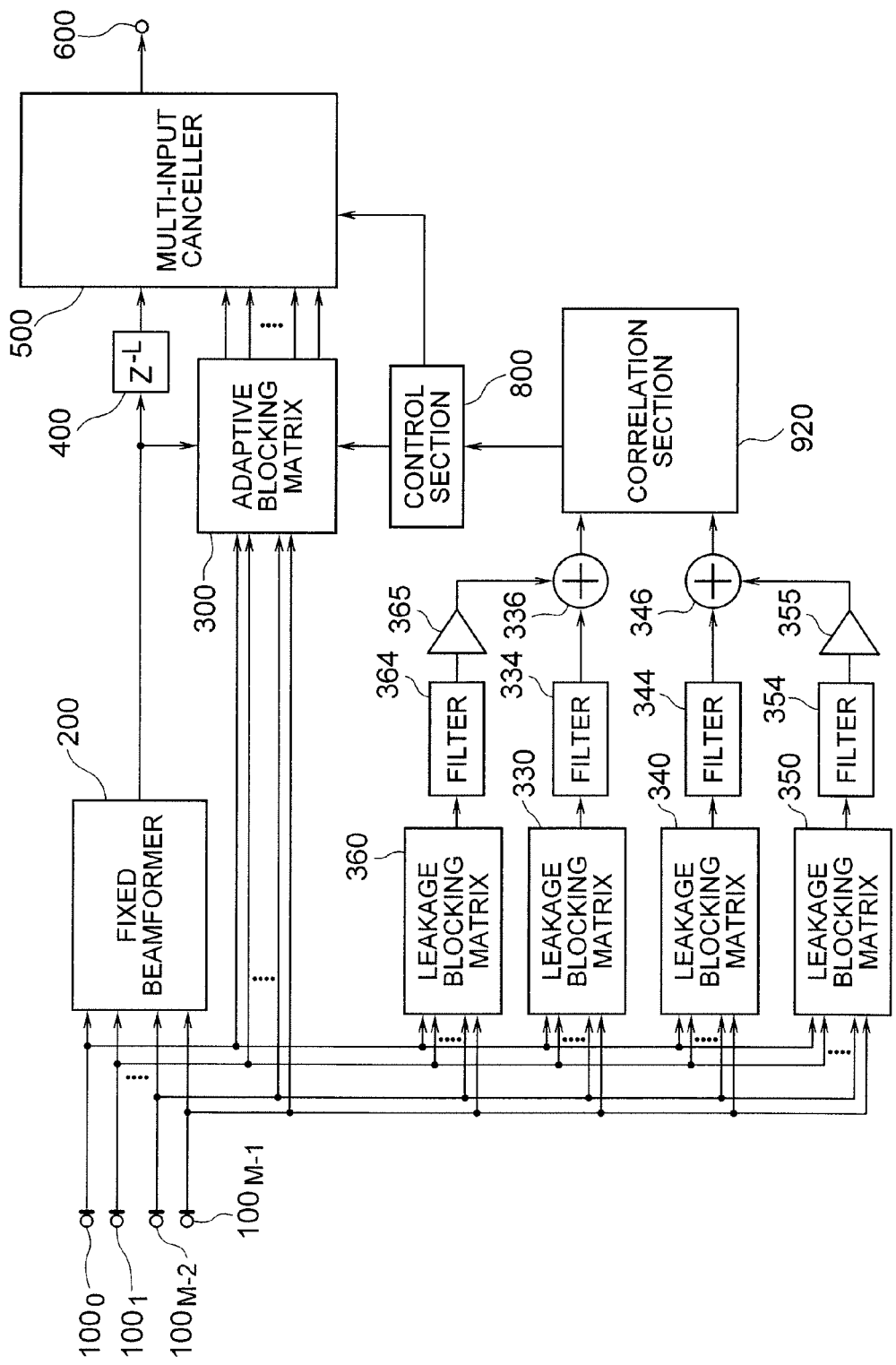
FIG. 16 is a block diagram showing an adaptive array device having an adaptive array control device according to a third exemplary embodiment of the invention.
Figure 17:
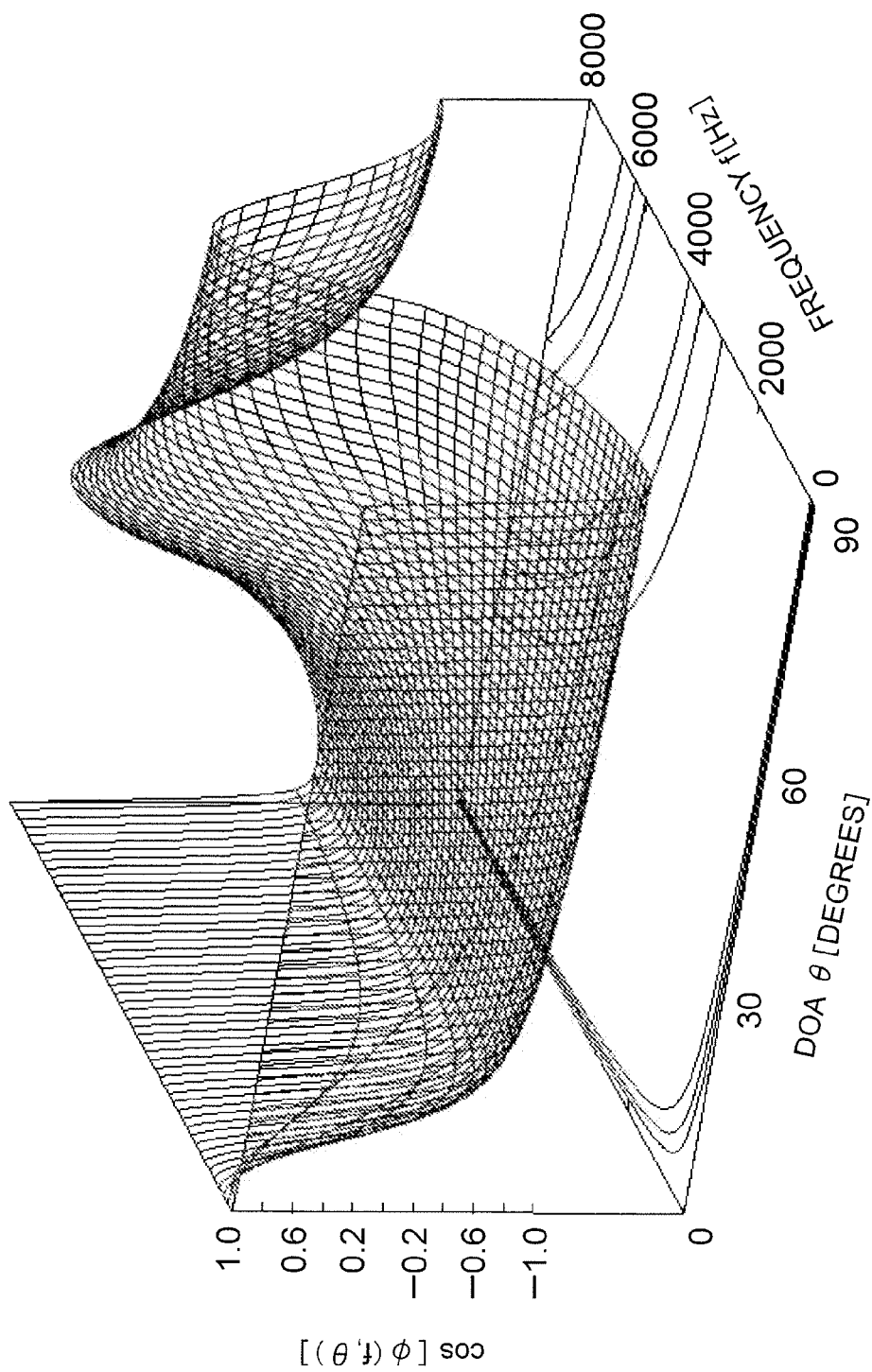
FIG. 17 is a block diagram showing of cosine of an output phase difference between the leakage blocking matrix circuits 330 and 340.
Figure 18:
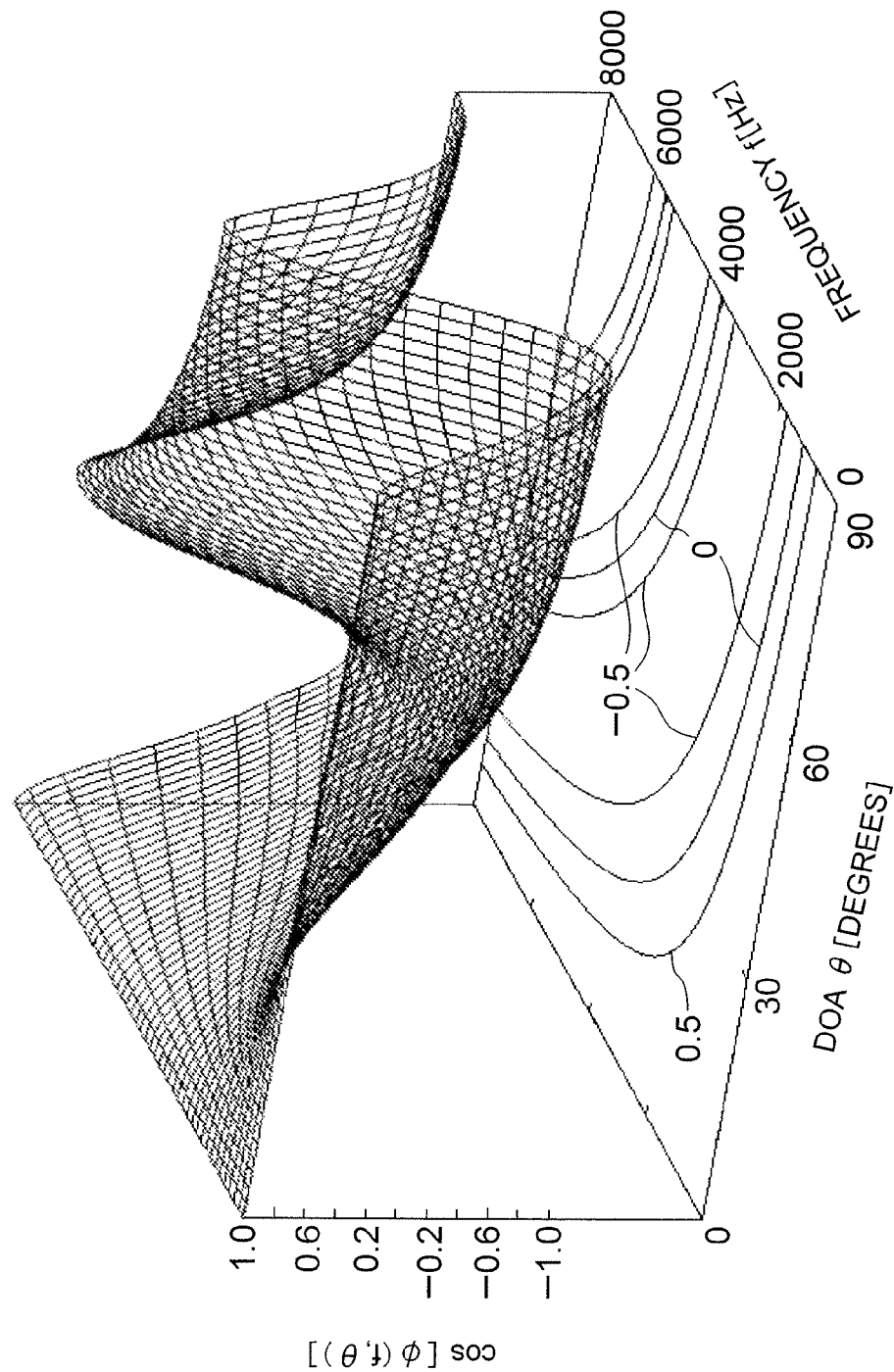
FIG. 18 is a block diagram showing of cosine of an output phase difference between the leakage blocking matrix circuits 350 and 360.
Figure 19:
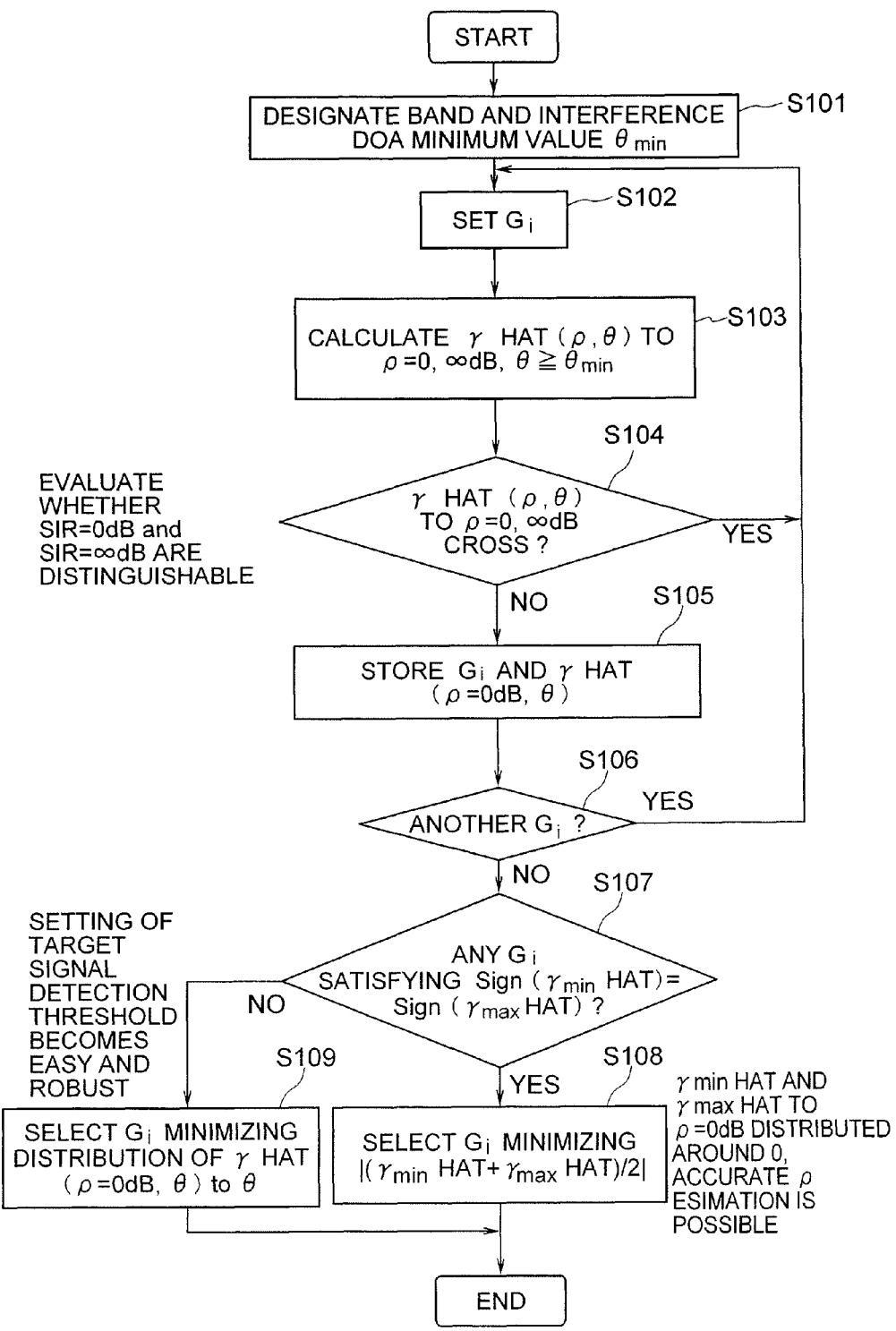
FIG. 19 is a flowchart showing an example of design method of a leakage coefficient.
Figure 20:
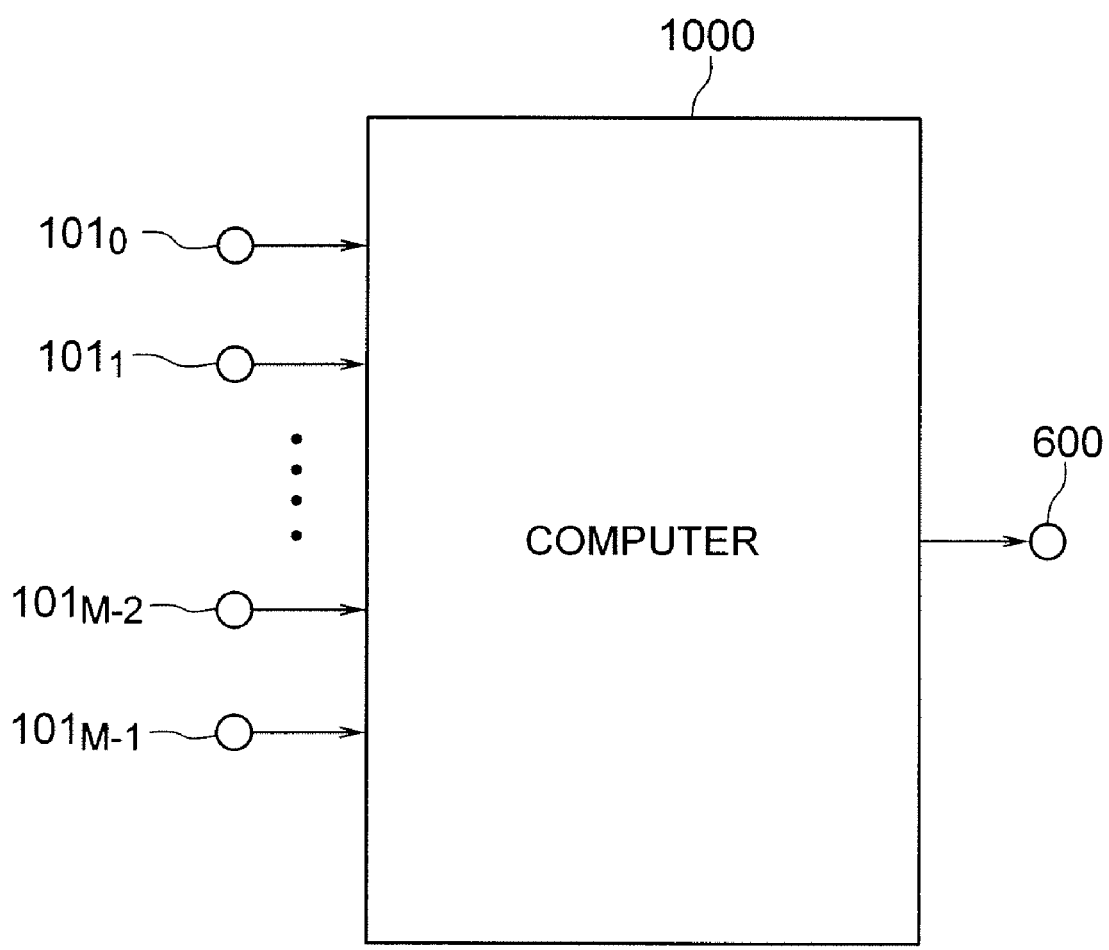
FIG. 20 is a block diagram showing an adaptive array device having an adaptive array control device according to a fourth exemplary embodiment of the invention.
Figure 21:
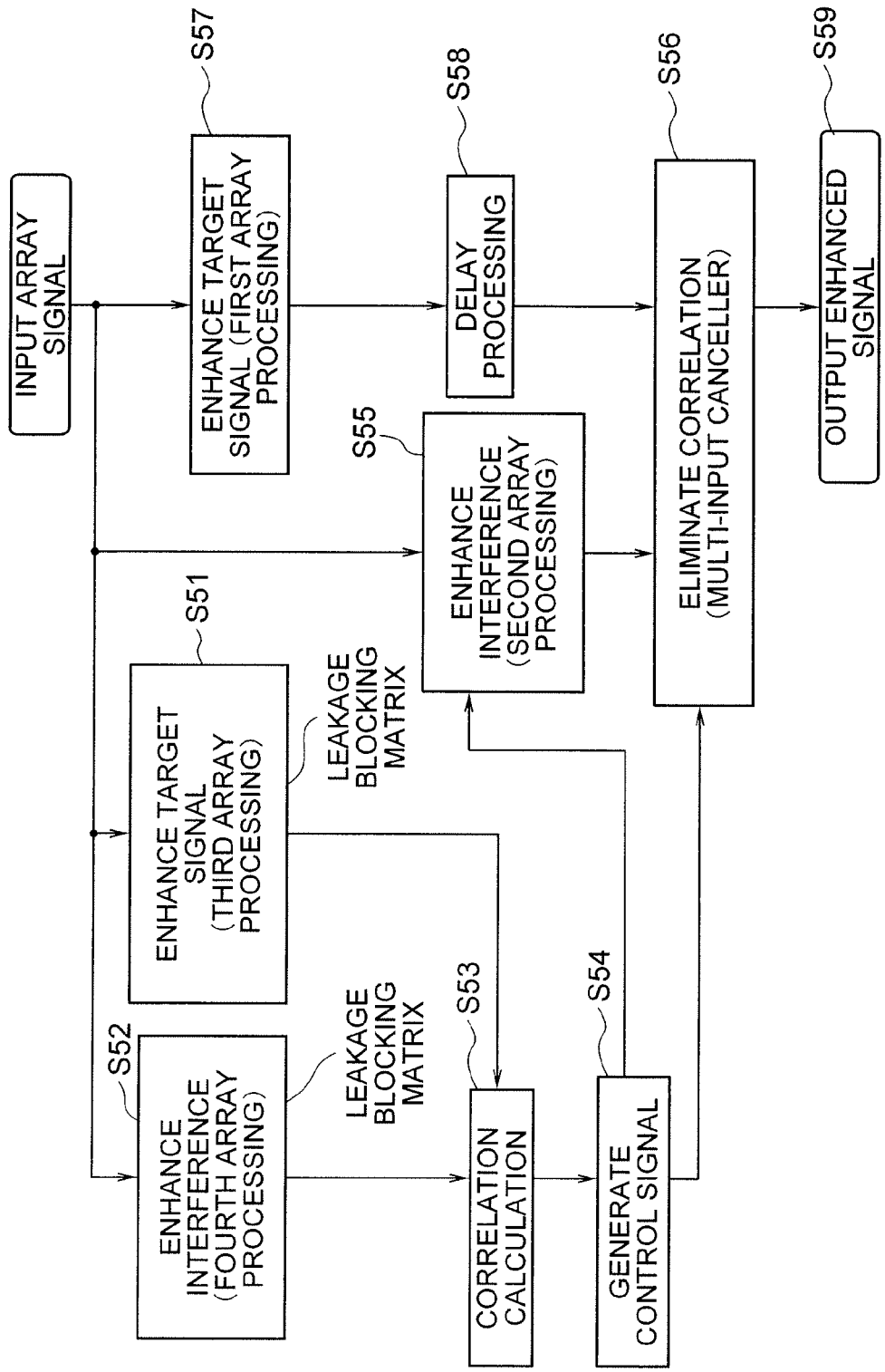
FIG. 21 is an operational flowchart of the adaptive array device according to the first exemplary embodiment of the invention.
Figure 22:
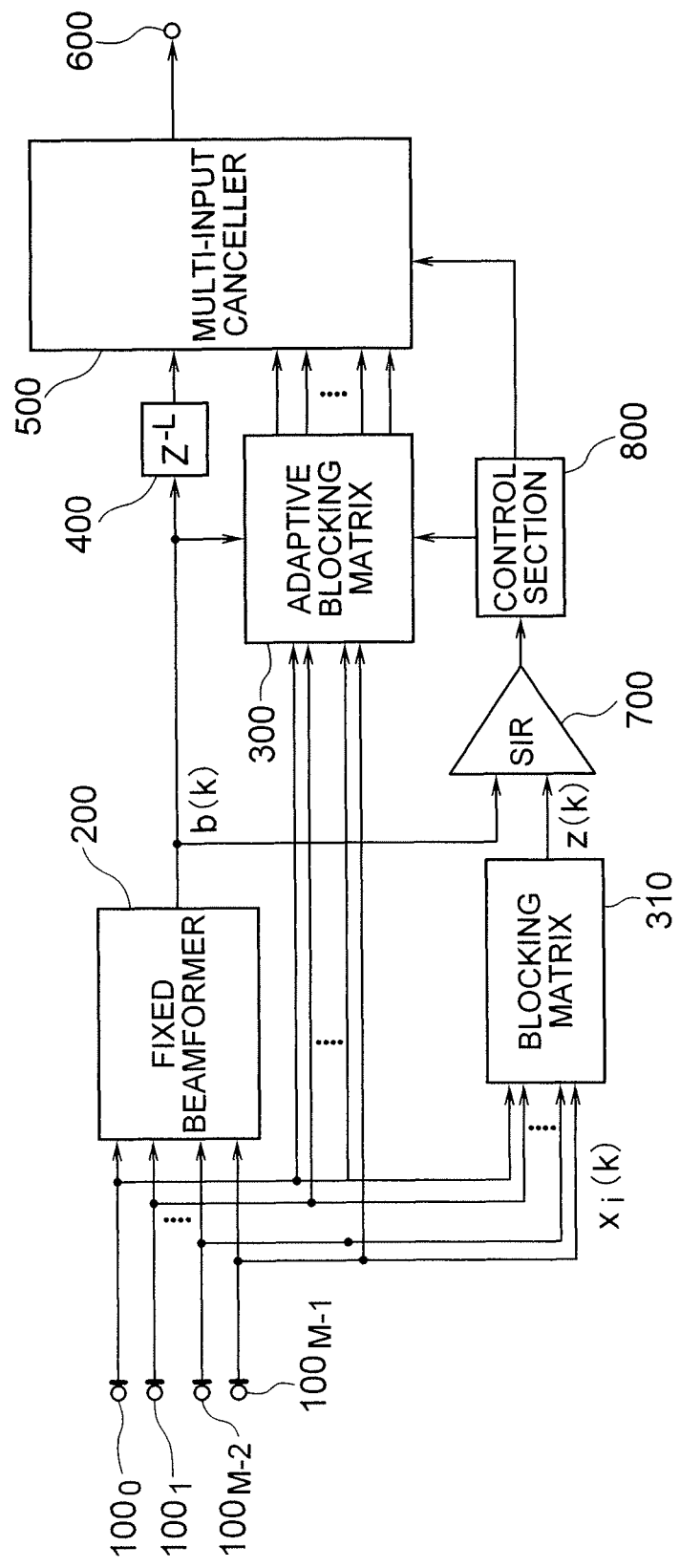
FIG. 22 is a block diagram of an adaptive array device having an adaptive array control device according to a traditional example.
Figure 23:
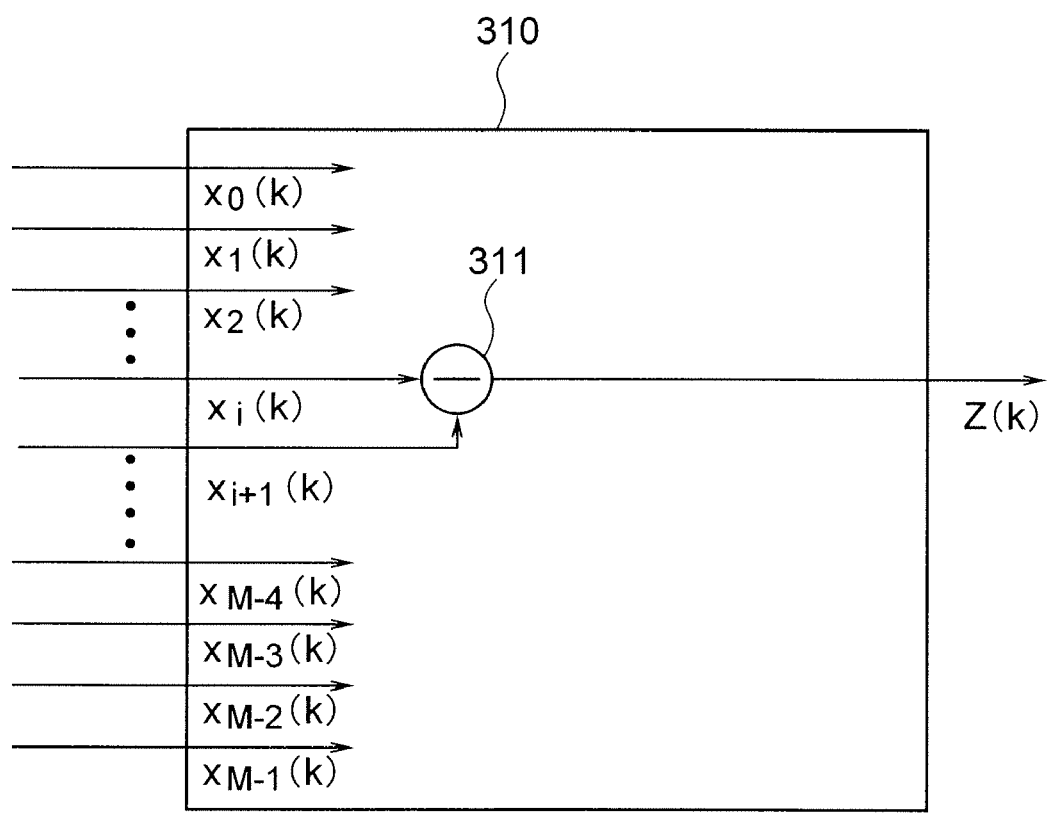
FIG. 23 is a blocking diagram showing an exemplary configuration of the blocking matrix circuit 310.

DESCRIPTION OF REFERENCE NUMERALS $100_0$~$100_{M-1}$ microphone
$101_0$~$101_{M-1}$ input terminal
200 fixed beamformer
300 adaptive blocking matrix circuit
310 blocking matrix circuit
311, $322_0$~$322_{M-2}$, $342_1$~$342_{M-1}$, subtracter
330, 340, 350, 360 leakage blocking matrix circuit
333, 343, 336, 346 adder
334, 344, 354, 364 filter
$331_1$-$331_{M-2}$, $341_1$-$341_{M-2}$, 355, 365 multiplier
400 delay element
500 multi-input canceller
600 output terminal
700 calculation section for target signal to interference ratio (SIR)
800 comparator section
920 correlation calculation section
1000 computer

The invention claimed is:

1. An adaptive array control device, comprising:
a first array processing section which performs first array processing with respect to a first signal among a plurality of signals transmitted from a plurality of sensors arranged in an array to thereby acquire a first array-processed signal;
a second array processing section which performs second array processing and has a transfer function with the same amplitude response and almost opposite phase response to that of the first array processing to thereby acquire a second array-processed signal;
a control signal generation section which acquires a control signal using the correlation between the first array-processed signal and the second array-processed signal; and
a control section which controls speed and accuracy of parameter adjustment in adaptive array processing using the control signal.

2. The adaptive array control device, according to claim 1, wherein the control signal generation section includes a correlation section which calculates correlation between the first array-processed signal and the second array-processed signal.

3. The adaptive array control device, according to claim 1, wherein the first array processing section has a first filter for processing the first array-processed signal.

4. The adaptive array control device, according to claim 1, wherein the second array processing section has a second filter for processing the second array-processed signal.

5. The adaptive array control device, according to claim 1, wherein the first array processing section includes a plurality of pairs of sensors having different sensor intervals.

6. The adaptive array control device, according to claim 1, wherein the second array processing section includes a plurality of pairs of sensors having different sensor intervals.

7. The adaptive array control device, according to claim 1, wherein the first array processing section includes a plurality of sub-array processing sections which perform array processing independently on a plurality of signals of different frequencies.

8. The adaptive array control device, according to claim 1, wherein the second array processing section includes a plurality of sub-array processing sections which perform array processing independently on a plurality of signals of different frequencies.

9. An adaptive array control device, comprising:
first array processing means for performing first array processing with respect to a first signal among a plurality of signals transmitted from a plurality of sensors arranged in an array to thereby acquire a first array-processed signal;
second array processing means for performing second array processing having a transfer function with the same amplitude response and almost opposite phase response to that of the first array processing to thereby acquire a second array-processed signal;
control signal generation means for acquiring a control signal using the correlation between the first array-processed signal and the second array-processed signal; and
control means for controlling speed and accuracy of parameter adjustment in adaptive array processing using the control signal.

10. An adaptive array controlling method comprising:
a first array-processed signal generation step and a second array-processed signal generation step for performing first array processing and second array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a first array-processed signal and a second array-processed signal;
a first control signal generation step for acquiring a control signal based on a relative ratio of a target signal and other signals among input signals using the first array-processed signal and the second array-processed signal acquired in the first array-processed signal generation step and the second array-processed signal generation step; and
a first parameter adjustment controlling step for controlling speed and accuracy of parameter adjustment in adaptive array processing using the control signal.

11. The adaptive array controlling method, according to claim 10, wherein in the first array processing and the second array processing performed in the first array-processed signal generation step and the second array-processed signal generation step, a gain with respect to a target signal is non-zero.

12. The adaptive array controlling method, according to claim 10, wherein in the first control signal generation step, the control signal is generated with use of correlation between the first array-processed signal and the second array-processed signal acquired in the first array-processed signal generation step and the second array-processed signal generation step.

13. The adaptive array controlling method, according to claim 10, wherein the first control signal generation step includes a first filter-processed signal generation step for filtering the first array-processed signal acquired in the first array-processed signal generation step and the second array-processed signal generation step to thereby acquire a first filter-processed signal, and the control signal is acquired using the first filter-processed signal acquired in this step.

14. The adaptive array controlling method, according to claim 10, wherein the first control signal generation step includes a second filter-processed signal generation step for filtering the second array-processed signal acquired in the first array-processed signal generation step and the second array-processed signal generation step to thereby acquire a second filter-processed signal, and the control signal is acquired using the second filter-processed signal acquired in this step.

15. The adaptive array controlling method, according to claim 10, wherein in the first array-processed signal generation step, signals acquired from a plurality of pairs of sensors having different sensor intervals are array-processed to thereby acquire a first array-processed signal.

16. The adaptive array controlling method, according to claim 10, wherein in the second array-processed signal generation step, signals acquired from a plurality of pairs of sensors having different sensor intervals are array-processed to thereby acquire a second array-processed signal.

17. The adaptive array controlling method, according to claim 10, wherein the first array-processed signal generation step includes a sub-array-processed signal generation step for performing array processing for a plurality of times corresponding to a plurality of different frequency bands to thereby acquire a plurality of sub-array-processed signals, and the first array-processed signal is acquired using the sub-array-processed signal acquired in the sub-array-processed signal generation step.

18. The adaptive array controlling method, according to claim 10, wherein the second array-processed signal generation step includes a sub-array-processed signal generation step for performing array processing for a plurality of times corresponding to a plurality of different frequency bands to thereby acquire a plurality of sub-array-processed signals, and the second array-processed signal is acquired using the sub-array-processed signal acquired in the sub-array-processed signal generation step.

19. A computer readable recording medium storing an adaptive array controlling program causing a computer to perform functions of:
 performing first array processing with respect to a first signal to thereby acquire a first array-processed signal;
 performing second array processing that has a transfer function with the same amplitude response and almost opposite phase response to that of the first array processing to thereby acquire a second array-processed signal;
 acquiring a control signal using the correlation between the first array-processed signal and the second array-processed signal; and
 controlling speed and accuracy of parameter adjustment in adaptive array processing using the control signal.

20. An array processing device comprising:
 a first array processing section and a second array processing section which performs first array processing and second array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a first array-processed signal and a second array-processed signal; and a direction estimation section which estimates a deviation, from a front, of a signal incoming direction using the first array-processed signal and the second array-processed signal.

21. An adaptive array processing device comprising:
 a third array processing section which enhances a first signal, among a plurality of signals transmitted from a plurality of sensors arranged in an array, with respect to other signals to thereby acquire a third array-processed signal;
 a fourth array processing section which attenuates the first signal with respect to other signals to thereby acquire a fourth array-processed signal;
 a correlation elimination section which eliminates a signal component correlated to the fourth array-processed signal from the third array-processed signal by means of adaptive array processing;
 a first array processing section which performs first array processing with respect to the first signal to thereby acquire a first array-processed signal;
 a second array processing section which performs second array processing and has a transfer function with the same amplitude response and almost opposite phase response to that of the first array processing to thereby acquire a second array-processed signal;
 a control signal generation section which acquires a control signal using the correlation between the first array-processed signal and the second array-processed signal; and
 a control section which controls speed and accuracy of parameter adjustment in adaptive array processing using the control signal.

22. The adaptive array processing device, according to claim 21, wherein the control signal generation section includes a correlation section which acquires correlation between the first array-processed signal and the second array-processed signal.

23. The adaptive array processing device, according to claim 21, wherein the first array processing section and the second array processing section perform array processing on signals acquired from a plurality of pairs of sensors having different sensor intervals to thereby acquire a first array-processed signal and a second array-processed signal.

24. An array processing device comprising:
 first array processing means and second array processing means for performing first array processing and second array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a first array-processed signal and a second array-processed signal; and
 direction estimation means for estimating a deviation, from a front, of a signal incoming direction using the first array-processed signal and the second array-processed signal.

25. An adaptive array processing device comprising:
 third array processing means for enhancing a first signal, among a plurality of signals transmitted from a plurality of sensors arranged in an array, with respect to other signals to thereby acquire a third array-processed signal;
 fourth array processing means for attenuating the first signal with respect to other signals to thereby acquire a fourth array-processed signal;

correlation elimination means for eliminating a signal component correlated to the fourth array-processed signal from the third array-processed signal by means of adaptive array processing;

first array processing means for performing first array processing with respect to the first signal to thereby acquire a first array-processed signal;

second array processing means for performing second array processing that has a transfer function with the same amplitude response and almost opposite phase response to that of the first array processing to thereby acquire a second array-processed signal;

control signal generation means for acquiring a control signal using the correlation between the first array-processed signal and the second array-processed signal; and control means for controlling speed and accuracy of parameter adjustment in adaptive array processing using the control signal.

26. An array processing method comprising:

a first array-processed signal generation step and a second array-processed signal generation step for performing first array processing and second array processing in which input signals are equal and a phase difference between output signals is zero with respect to a signal incoming from a direction vertical to an array, and with respect to a signal incoming from another direction, the phase difference takes a value between zero and 180 degrees corresponding to the direction, to thereby acquire a first array-processed signal and a second array-processed signal; and a signal deviation estimating step for estimating deviation, from a front, of a signal incoming direction with use of the first array-processed signal and the second array-processed signal.

27. An adaptive array processing method comprising:

a third array-processed signal generation step for enhancing a first signal, among a plurality of signals transmitted from a plurality of sensors arranged in an array, with respect to other signals to thereby acquire a third array-processed signal;

a fourth array-processed signal generation step for attenuating the first signal with respect to other signals to thereby acquire a fourth array-processed signal;

an adaptive array processing step for eliminating a signal component correlated to the fourth array-processed signal acquired in the fourth array-processed signal generation step from the third array-processed signal by means of adaptive array processing;

a first array-processed signal generation step for performing first array processing with respect to the first signal to thereby acquire a first array-processed signal;

a second array-processed signal generation step for performing second array processing that has a transfer function with the same amplitude response and almost opposite phase response to that of the first array processing to thereby acquire a second array-processed signal;

a second control signal generation step for acquiring a control signal using the correlation between the first array-processed signal and the second array-processed signal acquired in the first array-processing signal generation step and the second array-processed signal generation step; and a second parameter adjustment controlling step for controlling speed and accuracy of parameter adjustment in the adaptive array processing step using the control signal.

28. The adaptive array processing method, according to claim 27, wherein in the second control signal generation step, the control signal is generated using correlation between the first array-processed signal and the second array-processed signal.

29. The adaptive array processing method, according to claim 27, wherein in the first array-processed signal generation step and the second array-processed signal generation step, signals acquired from a plurality of pairs of sensors having different sensor intervals are array-processed to thereby acquire the first array-processed signal and the second array-processed signal.

30. A computer readable recording medium storing an adaptive array processing program causing a computer to perform functions of:

enhancing a first signal with respect to other signals to thereby acquire a third array-processed signal;

attenuating the first signal with respect to other signals to thereby acquire a fourth array-processed signal;

eliminating a signal component correlated to the fourth array-processed signal from the third array-processed signal by means of adaptive array processing;

performing first array processing with respect to the first signal to thereby acquire a first array-processed signal;

performing second array processing that has a transfer function with the same amplitude response and almost opposite phase response to that of the first array processing to thereby acquire a second array-processed signal;

acquiring a control signal using the correlation between the first array-processed signal and the second array-processed signal; and controlling speed and accuracy of parameter adjustment in the adaptive array processing using the control signal.

31. The adaptive array control device according to claim 2 wherein the first array processing is characterized in that a gain is non-zero.

32. The adaptive array control device according to claim 21, wherein the first array processing is characterized in that a gain is non-zero.

33. The adaptive array control device according to claim 24, wherein the first array processing is characterized in that a gain is non-zero.

34. The adaptive array control device according to claim 28, wherein the first array processing is characterized in that a gain is non-zero.

35. The adaptive array control device according to claim 30, wherein the first array processing is characterized in that a gain is non-zero.

36. An adaptive array control device comprising:

a first array processing section and a second array processing section in which phase responses are almost opposite with respect to a target signal and a signal incoming from another direction;

a control signal generation section which calculates a control signal using output signals of the first array processing section and the second array processing section; and a control section which controls speed and accuracy of parameter adjustment in adaptive array processing using the control signal.

37. The adaptive array control device, according to claim 36, wherein the control signal generation section acquires the control signal using correlation of output signals of the first array processing section and the second array processing section.

38. An adaptive array control device comprising:

a first array processing section and a second array processing section in which phase responses are almost opposite with respect to a target signal and a signal incoming from another direction;

control signal generation means for calculating a control signal using output signals of the first array processing section and the second array processing section; and control means for controlling speed and accuracy of parameter adjustment in adaptive array processing using the control signal.

39. An adaptive array controlling method comprising:

a first array-processed signal generation step and a second array-processed signal generation step for performing first array processing and second array processing in which phase responses are almost opposite with respect to a target signal and a signal incoming from another direction to thereby acquire a first array-processed signal and a second array-processed signal;

a first control signal generation step for acquiring a control signal based on a relative ratio of the target signal and another signal using the first array-processed signal and the second array-processed signal; and a first parameter adjustment controlling step for controlling speed and accuracy of parameter adjustment in adaptive array processing using the control signal.

40. The adaptive array controlling method, according to claim 39, wherein in the first control signal generation step, the control signal is generated using correlation between the first array-processed signal and the second array-processed signal acquired in the first array-processed signal generation step and the second array-processed generation step.

41. An adaptive array controlling program causing a computer to perform functions of:

performing first array processing and second array processing in which phase responses are almost opposite with respect to a target signal and a signal incoming from another direction to thereby acquire a first array-processed signal and a second array-processed signal;

acquiring a control signal using the first array-processed signal and the second array-processed signal; and controlling speed and accuracy of parameter adjustment in adaptive array processing using the control signal.

* * * * *